(12) United States Patent
Kang

(10) Patent No.: US 7,233,968 B2
(45) Date of Patent: Jun. 19, 2007

(54) FAST FOURIER TRANSFORM APPARATUS

(75) Inventor: Jeong-Soo Kang, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 714 days.

(21) Appl. No.: 10/426,318

(22) Filed: Apr. 30, 2003

(65) Prior Publication Data
US 2004/0015530 A1    Jan. 22, 2004

(30) Foreign Application Priority Data
Jul. 22, 2002   (KR)  ............................... 2002-42852

(51) Int. Cl.
*G06F 15/00* (2006.01)
(52) U.S. Cl. ...................... 708/404; 708/408
(58) Field of Classification Search ................ 708/403, 708/404, 406, 408
See application file for complete search history.

(56) References Cited

U.S. PATENT DOCUMENTS

| | | | | |
|---|---|---|---|---|
| 4,159,528 A | * | 6/1979 | Perry | .......................... 708/403 |
| 5,831,883 A | * | 11/1998 | Suter et al. | .................. 708/404 |
| 6,088,714 A | * | 7/2000 | Wadleigh | ..................... 708/404 |
| 6,304,887 B1 | * | 10/2001 | Ju et al. | ...................... 708/404 |
| 6,317,770 B1 | | 11/2001 | Lim et al. | |
| 6,463,451 B2 | | 10/2002 | Lim et al. | |

FOREIGN PATENT DOCUMENTS

| | | |
|---|---|---|
| KR | 10-0284181 | 12/2000 |
| KR | 01-0036860 | 5/2001 |

* cited by examiner

*Primary Examiner*—Chuong D. Ngo
(74) *Attorney, Agent, or Firm*—Mills & Onello LLP

(57) ABSTRACT

A data transform system performs FFT and IFFT computations with respect to N data points. The data transform system performs radix-R (R is an integer) butterfly computation in parallel by use of M arithmetic elements. Serial and parallel computation structures a recombined to provide a system that provides for optimal trade-off between system speed and the size of the resulting hardware.

32 Claims, 24 Drawing Sheets

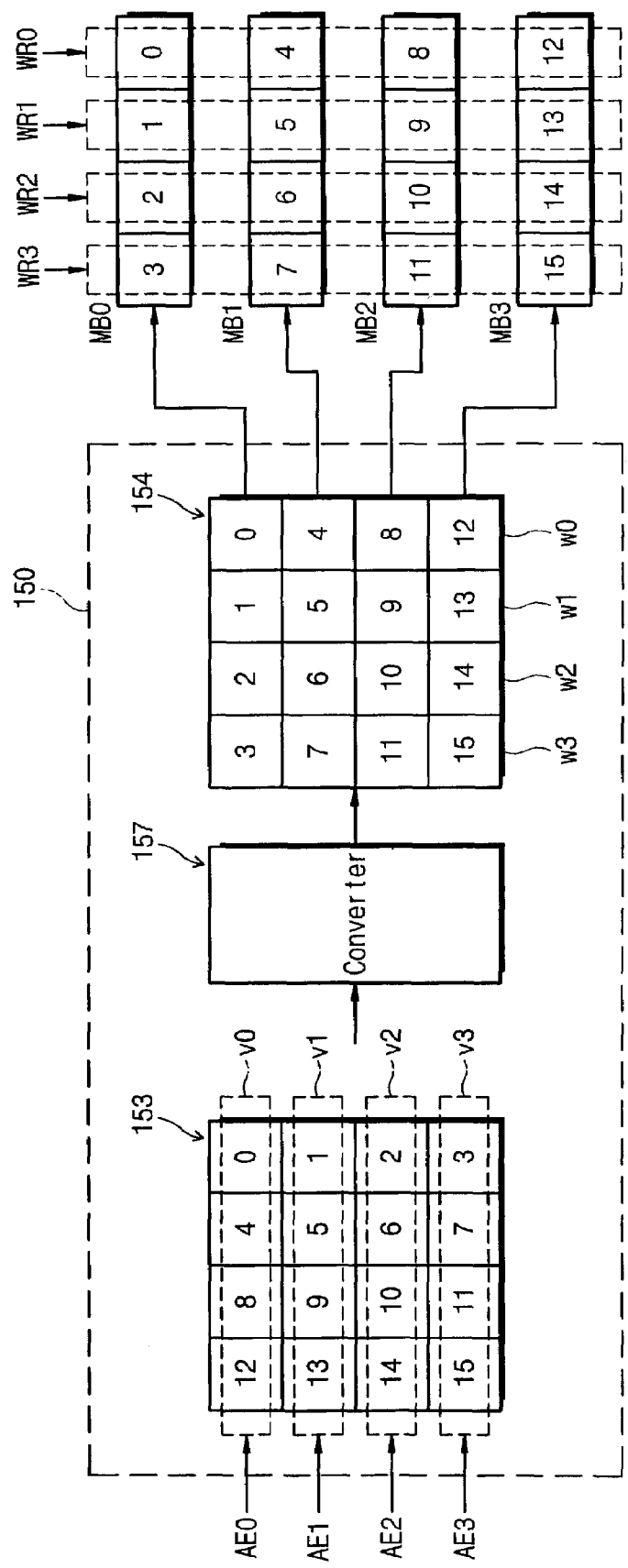

Fig. 10

| Bank ADD. | Location ADD. | Data Index before FFT Computation | Data Index after FFT Computation |
|---|---|---|---|
| 00 | 00 | 0000 | 0000 |
|    | 01 | 0001 | 1000 |
|    | 10 | 0010 | 0100 |
|    | 11 | 0011 | 1100 |
| 01 | 00 | 0100 | 0010 |
|    | 01 | 0101 | 1010 |
|    | 10 | 0110 | 0110 |
|    | 11 | 0111 | 1110 |
| 10 | 00 | 1000 | 0001 |
|    | 01 | 1001 | 1001 |
|    | 10 | 1010 | 0101 |
|    | 11 | 1011 | 1101 |
| 11 | 00 | 1100 | 0011 |
|    | 01 | 1101 | 1011 |
|    | 10 | 1110 | 0111 |
|    | 11 | 1111 | 1111 |

Fig. 11

| Bank ADD. | Location ADD. | Data Index before FFT Computation | Data Index after FFT Computation |
|---|---|---|---|
| 00 | 000000000 | 00000000000 | 00000000000 |
| | 000000001 | 00000000001 | 10000000000 |
| | 000000010 | 00000000010 | 01000000000 |
| | 000000011 | 00000000011 | 11000000000 |
| | ⋮ | ⋮ | ⋮ |
| | 000011111 | 00000011111 | 11000011100 |
| | 000100000 ⋮ 111111111 | ///// | ///// |
| 01 | 000000000 | 01000000000 | 00000000010 |
| | 000000001 | 01000000001 | 10000000010 |
| | 000000010 | 01000000010 | 01000000010 |
| | 000000011 | 01000000011 | 11000000010 |
| | ⋮ | ⋮ | ⋮ |
| | 000011111 | 01000011111 | 11000011110 |
| | 000100000 ⋮ 111111111 | ///// | ///// |
| 10 | 000000000 | 10000000000 | 00000000001 |
| | 000000001 | 10000000001 | 10000000001 |
| | 000000010 | 10000000010 | 01000000001 |
| | 000000011 | 10000000011 | 11000000001 |
| | ⋮ | ⋮ | ⋮ |
| | 000011111 | 10000011111 | 11000011101 |
| | 000100000 ⋮ 111111111 | ///// | ///// |
| 11 | 000000000 | 11000000000 | 00000000011 |
| | 000000001 | 11000000001 | 10000000011 |
| | 000000010 | 11000000010 | 01000000011 |
| | 000000011 | 11000000011 | 11000000011 |
| | ⋮ | ⋮ | ⋮ |
| | 000011111 | 11000011111 | 11000011111 |
| | 000100000 ⋮ 111111111 | ///// | ///// |

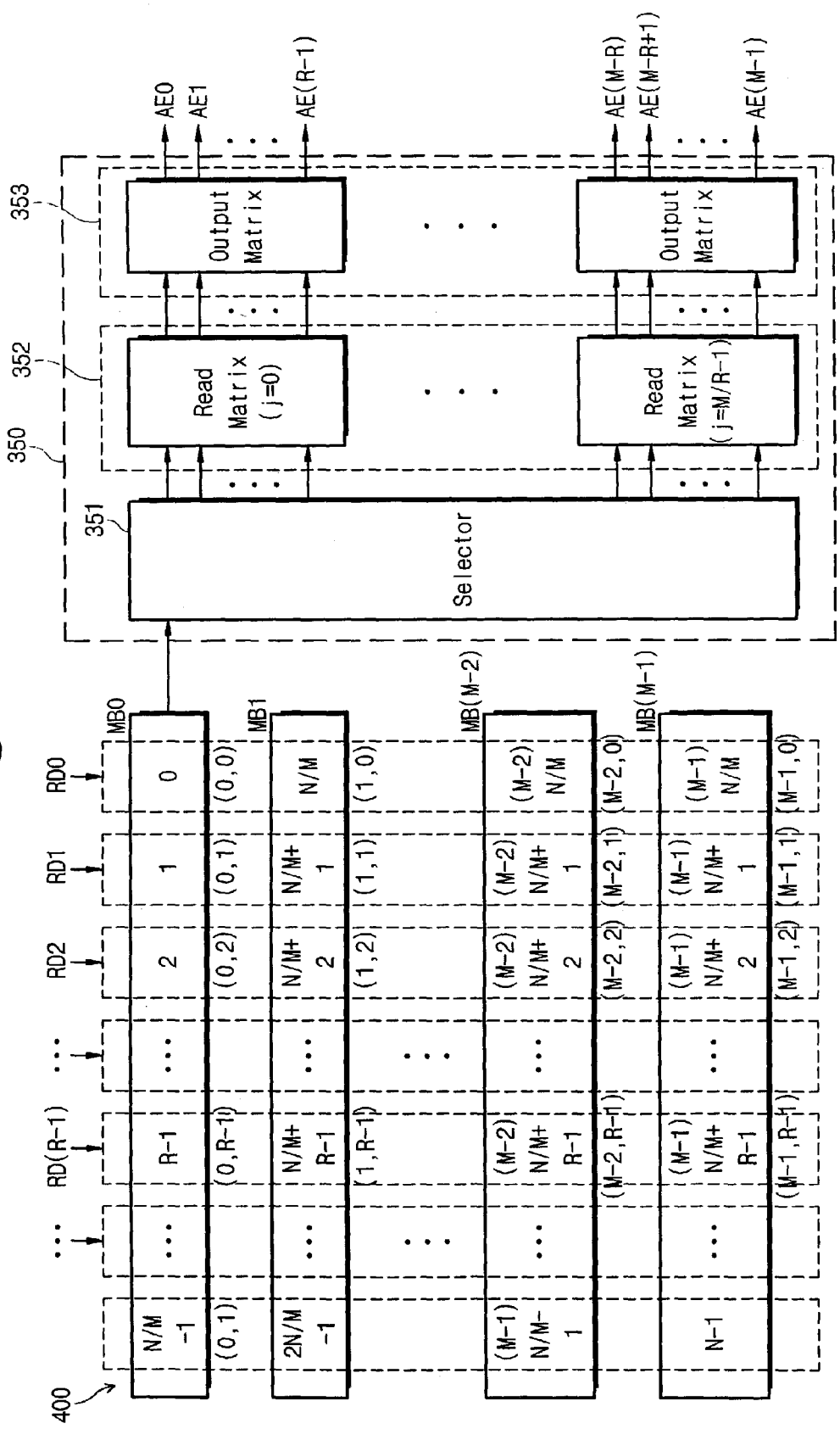

FAST FOURIER TRANSFORM APPARATUS

FIELD OF THE INVENTION

The present invention relates to an apparatus capable of performing Fast Fourier Transform (FFT) computation.

BACKGROUND OF THE INVENTION

Bi-directional digital data transmission systems are continually under development to enable high-speed data communication. A contemporary standard for high-speed data communication is Asymmetric Digital Subscriber Lines (ADSL). Another standard for high-speed data communications is known as Very High Speed Digital Subscriber Lines (VDSL). Like ADSL, VDSL employs Discrete Multi-Tone (DMT) modulation. However, in order to improve the transmission speed of data, the VDSL uses more sub-channels than ADSL.

Meanwhile, the DMT process involves Orthogonal Frequency Division Multiplexing (OFDM). Transmitted data at a transmitter is manipulated according to each sub-channel in the frequency domain and transformed to time domain data for transmission to the various channels. Reverse operations are performed at the receiver. The OFDM is realized through a Discrete Fourier Transform (DFT), which transforms frequency domain signals to time domain signals or time domain signals to frequency domain signals. The VDSL includes sub-channels (4096) more than those (256) of the ADSL. Since the number of sub-channels indicates the length of DFT, the VDSL requires more computations than the ADSL. The DFT principle is as follows.

$$X[k] = \sum_{n=0}^{N-1} x[n] \cdot W_N^{nk} (n, k = 0, 1, \ldots, N-1) \quad \text{[EQUATION 1]}$$

$$W[k] = e^{-j\frac{2\pi}{N}k}$$

In the above equation, N time domain data are transformed to N frequency domain data. W[k] is referred to as a coefficient or "twiddle" factor. In computations performed with respect to a given N, a complex multiplication is carried out by N*N and a complex addition is carried out by N*(N−1). The complexity is 0(N*N).

To implement the DFT, Cooley & Tukey proposed the FFT algorithm in the 1960's. Radix-2 FFT and radix-4 FFT represent the proposed FFT algorithm. The radix-2 FFT principle is as follows.

$$X[k] = \sum_{n=0}^{\frac{N}{2}-1} x[2n] \cdot W_N^{2nk} + \sum_{n=0}^{\frac{N}{2}-1} x[2n+1] \cdot W_N^{(2n+1)k} \quad \text{[EQUATION 2]}$$

$$W[k] = e^{-j\frac{2\pi}{N}k}$$

As will be seen from the equation 2, a radix-2 FFT processor performs DFT computation that is divided into odd and even portions.

FIG. 1 shows a data flow according to a 16-point radix-2 FFT computation. Referring to FIG. 1, input data x[15:0] is output as output data X[15:0] through processing stages STAGE 1–STAGE 4. With the radix-2 FFT, a complex multiplication is performed by $$\frac{N}{2} \times \log_2^N$$

and a complex addition is performed by $N \times \log_2^N$. Thus, the complexity of the radix-2 FFT becomes $0(N \times \log_2^N)$, while the complexity of the DMT becomes $0(N*N)$. In case of an example illustrated in FIG. 1, a complex multiplication is performed by 32

$$\left(\frac{16}{2} \times \log_2^{16}\right)$$

and a complex addition is performed by $$64 \ (16 \times \log_2^{16}).$$

A hardware structure is essentially considered together with selection of the FFT algorithm. Various FFT structures include single-processor, pipeline, parallel-iterative, and array structures, based on arithmetic unit scheme. Selection of such structures may be determined on the basis of computation time, hardware size, and power consumption.

FIG. 2 shows a conventional data transform system. Referring to FIG. 2, a conventional data transform system includes a data converter 10 and a memory 20. The data converter 10 performs FFT and IFFT computations. In the FFT computation, time domain data from a time domain interface is transformed to frequency domain data, and then resultant data is output to a frequency domain interface. In the IFFT computation, frequency domain data from the frequency domain interface is transformed to time domain data, and the resultant data is output to the time domain interface. Computed results are stored in the memory 20.

The data converter 10 is formed of a main controller 11, a coefficient table 12, an arithmetic unit 13, a memory interface 14, and a compressor/expander 15. The coefficient table 12 stores a coefficient $W_N$ required for butterfly computation, and the arithmetic unit 13 performs FFT or IFFT computation with respect to input data. The memory interface 14 performs interface operations between the arithmetic unit 13 and the data memory 20, between the compressor/expander 15 and the data memory 20, and between a frequency domain interface and the data memory 20. While in an IFFT mode, the compressor/expander 15 expands complex-type data read out from the data memory 20 to real-type data, and outputs resultant data to a time domain interface. In an FFT mode, the compressor/expander 15 compresses real-type data from the time domain interface into complex-type data and outputs resultant data to the data memory 20 via the memory interface 14.

FIG. 3 shows an exemplary single-processor structure that includes a single arithmetic element and performs serial computation. In FIG. 3, memory 20A stores data prior to computation and memory 20B stores data following computation. The memories 20A and 20B form the data memory 20 illustrated in FIG. 2. Referring to FIG. 3, an arithmetic element AE0 has a hardware scheme according to an adopted computation algorithm. For example, it is assumed that symbol 't' represents the time required for the arithmetic element AE0 of a radix-2 FFT algorithm to perform the butterfly computation in FIG. 1. It will take a time of $$\left(\frac{N}{2} \times \log_2^N\right) \times t$$

to perform the radix-2 FFT computation with respect to N data elements.

FIG. 4 shows an exemplary parallel processor structure that has an arithmetic unit 13 composed of k arithmetic elements (k is 0~N−1) and performs parallel computation. In FIG. 4, memory 20A stores data prior to computation and memory 20B stores data following computation. The memories 20A and 20B form one memory, that is, data memory 20 in FIG. 2. For example, $$\frac{N}{2}$$

arithmetic elements are required to process butterfly computations in parallel at any stage in accordance with a radix-2 FFT algorithm. When N=2048, the arithmetic unit 13 necessitates 1024 arithmetic elements. Implementation of a practical hardware having numerous arithmetic elements necessitates several-million to ten-million gates, thus making it difficult to implement the hardware. As a result, a speed of one-stage parallel computation is rapid, but numerous elements are necessitated to process the vast amount of data required by the VDSL process. This results in an increased consumption of valuable circuit area.

Accordingly, there is required a FFT processor that is rapid in speed and occupies a relatively small circuit area.

SUMMARY OF THE INVENTION

It is therefore an object of the invention to provide a Fast Fourier transform apparatus capable of performing the Fast Fourier Transform process by block-parallel computation involving a combination of serial and parallel computations.

It is another object of the invention to provide a Fast Fourier Transform apparatus capable of enabling a circuitry to be constructed on the basis of the trade-off between speed and hardware size.

In accordance with one aspect of the present invention, a data transform system is provided which performs Fast Fourier Transform (FFT) and Inverse Fast Fourier Transform (IFFT) computations. M arithmetic elements perform radix-R (R is an integer) butterfly computation with respect to input data to provide output data, respectively. A data memory is divided into M banks and stores data computed by the arithmetic elements. A memory interface reads out M*R data points stored in the banks and stores the output data computed by the arithmetic elements in the data memory, and provides the read M*R data points to the arithmetic elements by R, as the input data.

Preferably, the memory interface includes data read means that provides the M*R data points to the arithmetic elements in parallel by R; and data write means that stores the data computed by the arithmetic to the banks in parallel.

In a preferred embodiment, the M*R data points are stored sequentially in the M banks, and M is equal to R.

In a preferred embodiment, the data read means includes a first buffer array that has buffers arranged in a matrix of rows and columns and stores the M*R data points read out from the banks; a second buffer array that has buffers arranged in a matrix of rows and columns; and a first converter that performs a transpose transform operation with respect to data points in the first buffer array and stores the data points thus transformed in the second buffer array.

In a preferred embodiment, the data write means includes a third buffer array that has buffers arranged in rows and columns and stores data computed by the arithmetic elements; a fourth buffer array that has buffers arranged in rows and columns; and a second converter that performs a transpose transform operation with respect to data points in the third buffer array and stores the data points thus transformed in the fourth buffer array.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8B is a diagram for describing how results computed by the arithmetic elements are stored in the data memory via the memory interface during the first stage;

FIG. 10 is a table in which data indexes before and after FFT computation are tabulated when a data memory is divided into four memory banks each storing four data;

FIG. 11 is a table in which data indexes before and after FFT computation are tabulated when a data memory having $2^5$ storage locations is divided into four memory banks and $2^5$ data bits are stored in each memory bank;

FIG. 18 is a block diagram of generalized data memory and memory interface of a data transform system according to the second embodiment of the present invention.

DETAILED DESCRIPTION OF PREFERRED EMBODIMENTS

The preferred embodiments of the invention will be more fully described with reference to the attached drawings.

First Embodiment

Figure 1:
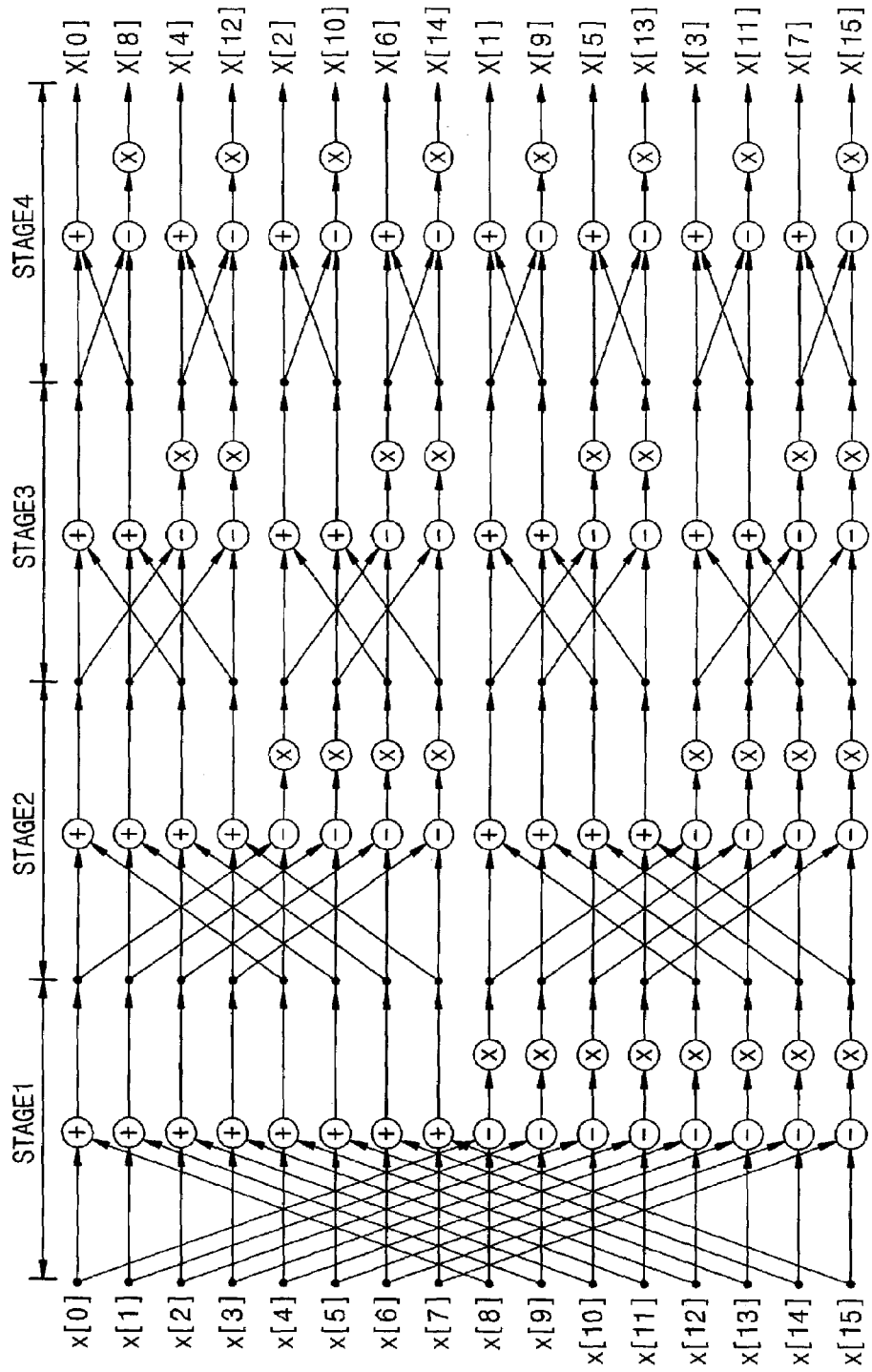
FIG. 1 is a diagram showing data flow according to a 16-point radix-2 FFT computation.
Figure 2:
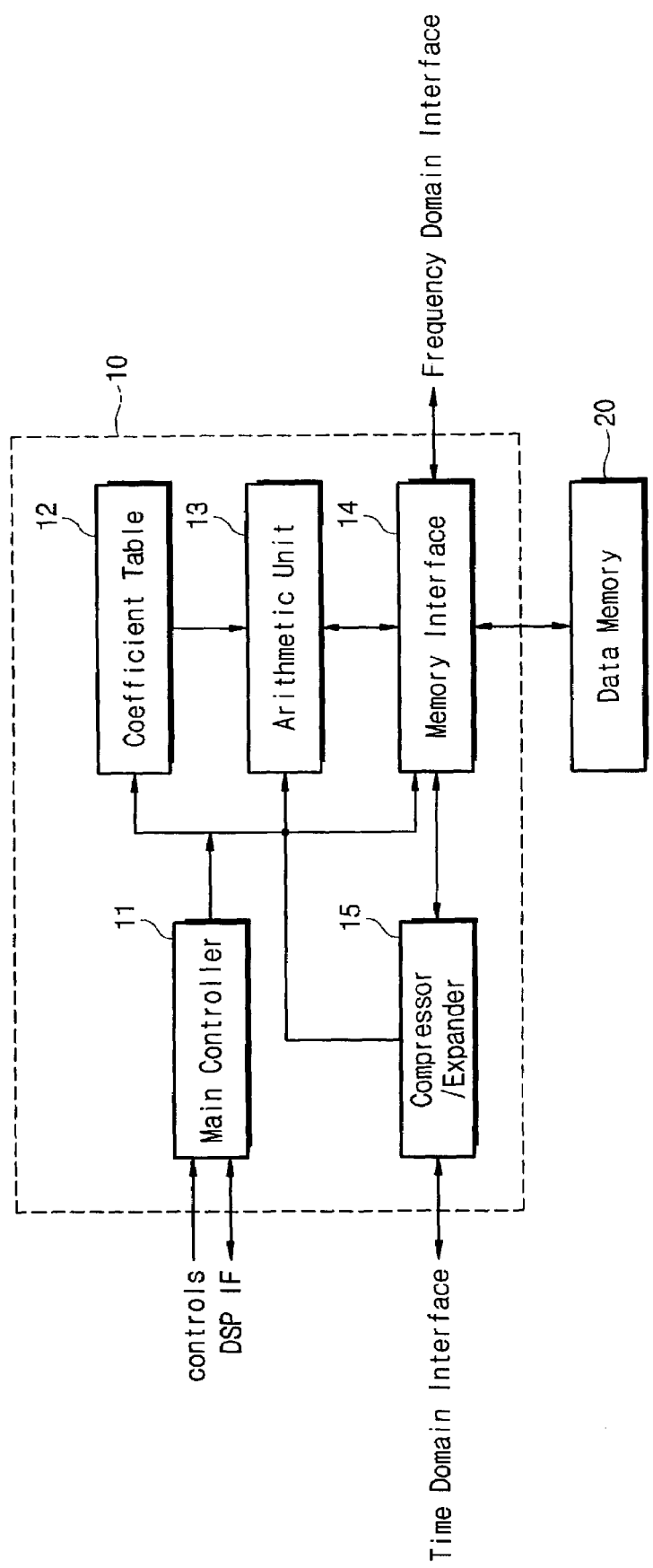
FIG. 2 is a block diagram of a conventional data transform system.
Figure 3:
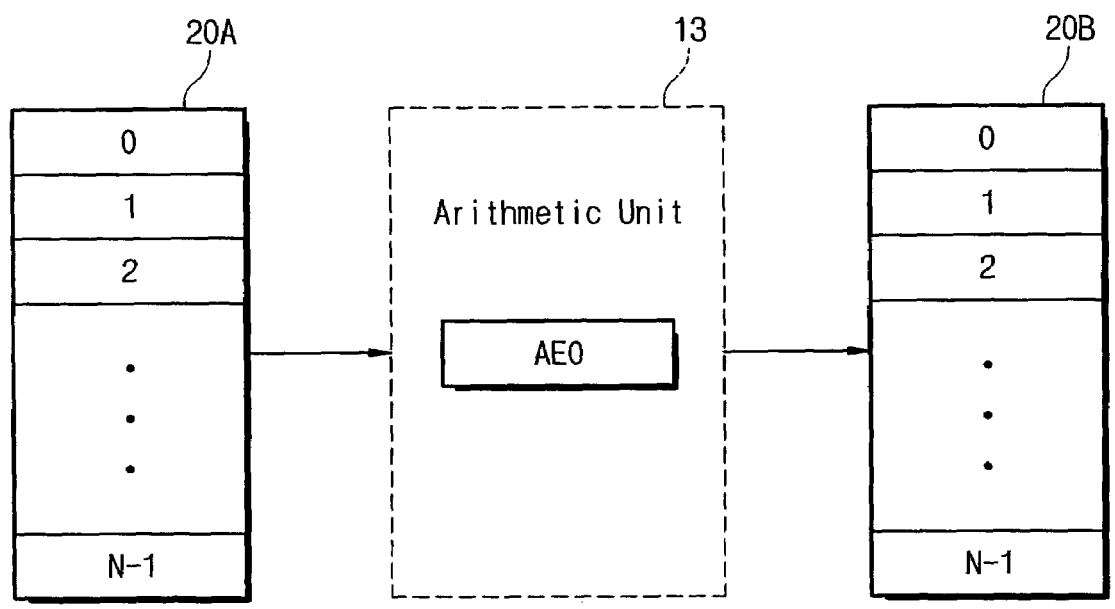
FIG. 3 shows a conventional single-processor structure that has a single arithmetic element and performs serial computation.
Figure 4:
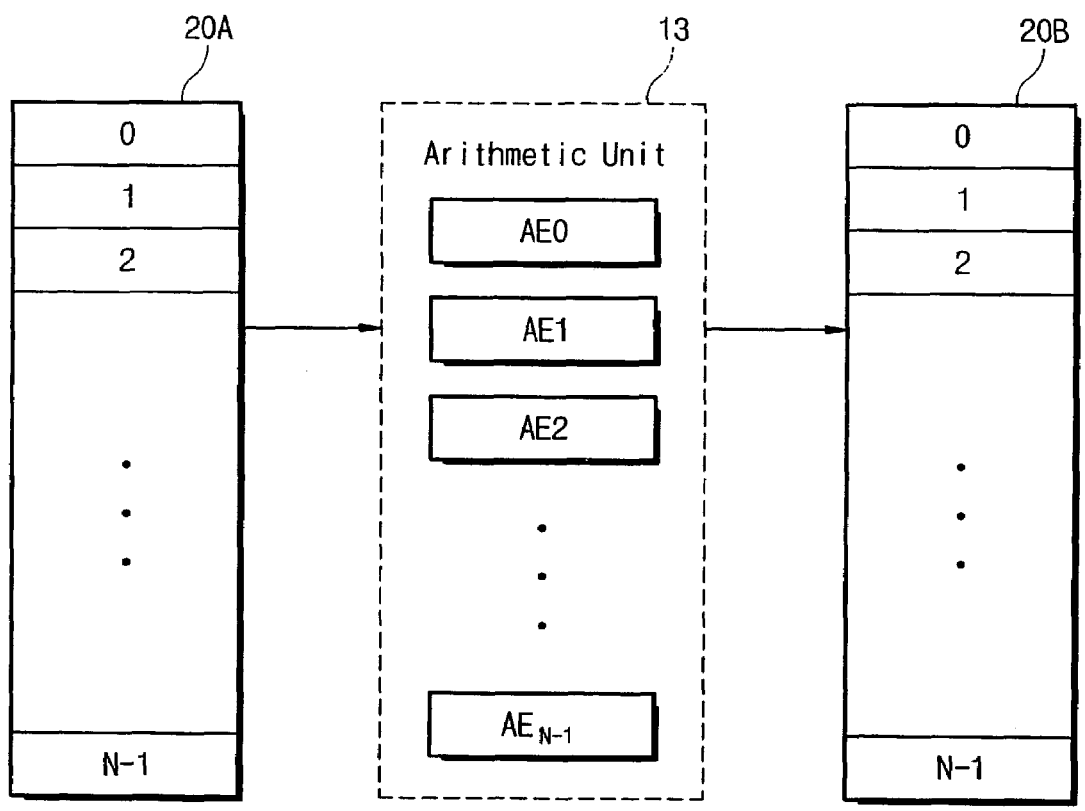
FIG. 4 shows a conventional parallel processor structure that has an arithmetic unit composed of k arithmetic elements and performs parallel computation.
Figure 5:
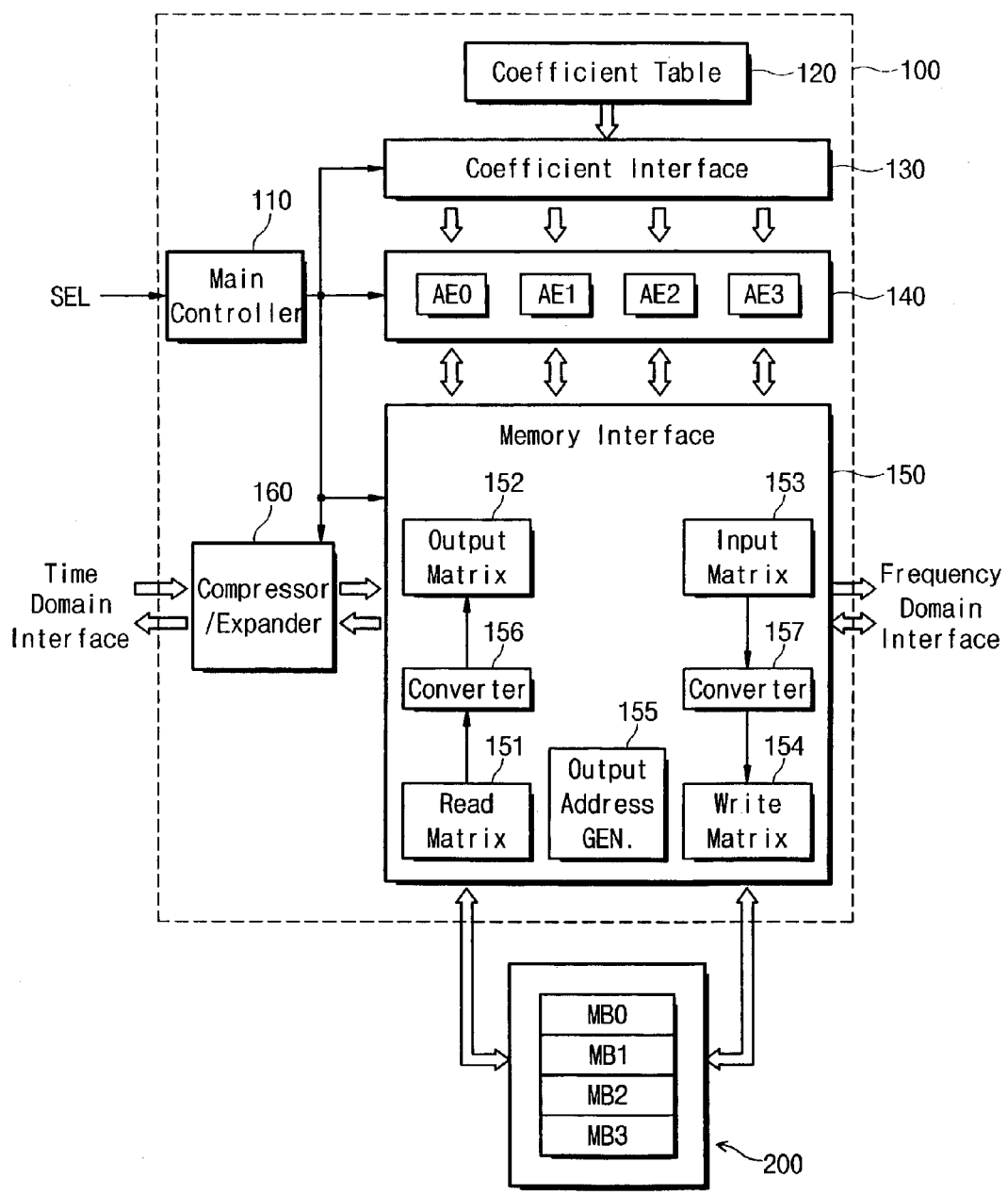
FIG. 5 is a block diagram of a data transform system according to a first embodiment of the present invention.

FIG. 5 shows a data transform system according to the present invention. Referring to FIG. 5, a data transform system according to the present invention includes a data converter 100 for performing FFT and IFFT computations and a data memory 200 for storing resultant data computed by the data converter 100. The data converter 100 is formed of a main controller 110, a coefficient table 120, a coefficient interface 130, an arithmetic unit 140, a memory interface 150, and a compressor/expander 160. One aspect of an exemplary embodiment according to the present invention is that the arithmetic unit 140 has M arithmetic elements to perform radix-R FFT/IFFT computation (in this embodiment, M is equal to R). An exemplary data converter 100 incorporates an arithmetic unit 140 that is formed of four arithmetic elements AE_A to AE_D to perform radix-4 FFT/IFFT computation with respect to N data points.

The main controller 110 controls all components of the data converter 100 in response to a mode selection signal SEL received from an external source. For example, when the mode selection signal SEL is at a high level, the data converter 100 performs FFT computation. When the mode selection signal SEL is at a low level, the data converter 100 performs IFFT computation. The coefficient table 120 stores coefficients for the FFT and IFFT computations. The coefficient interface 130 reads out coefficients from the coefficient table 120 and provides the read coefficients to the arithmetic unit 140.

Continuing to refer to FIG. 5, the arithmetic unit 140 includes four arithmetic elements AE0 to AE3 to perform radix-4 FFT/IFFT computation in parallel. Each arithmetic element performs butterfly computation for radix-4 FFT/IFFT, which will be more fully described below.

The memory interface 150 is formed of a read matrix 151, an output matrix 153, an input matrix 154, a write matrix 154 and converters 156 and 157, and controls data read and write operations between a frequency domain interface and the data memory 200 and between the arithmetic unit 140 and the data memory 200. The memory interface 150 writes time domain data from the compressor/expander 160 into the data memory 200. After completion of an FFT computation, the memory interface 150 reads out data from the data memory 200 and outputs read data to a frequency domain interface. The memory interface 150 writes frequency domain data from the frequency domain interface in the data memory 200. After completion of IFFT computation, the memory interface 150 reads out data from the data memory 200 and outputs read data to the compressor/expander 160. During the FFT/IFFT computation, the memory interface 150 reads data from the memory 200 for transfer to the arithmetic units AE0–AE3, and writes result data computed by the units AE0–AE3 into data memory 200. Circuit configuration and operation of the memory interface 150 will be described below. In this embodiment, the data converter 100 will be described using exemplary FFT computation. However, it is apparent that the data converter 100 is not limited to this disclosed example.

Figure 6:
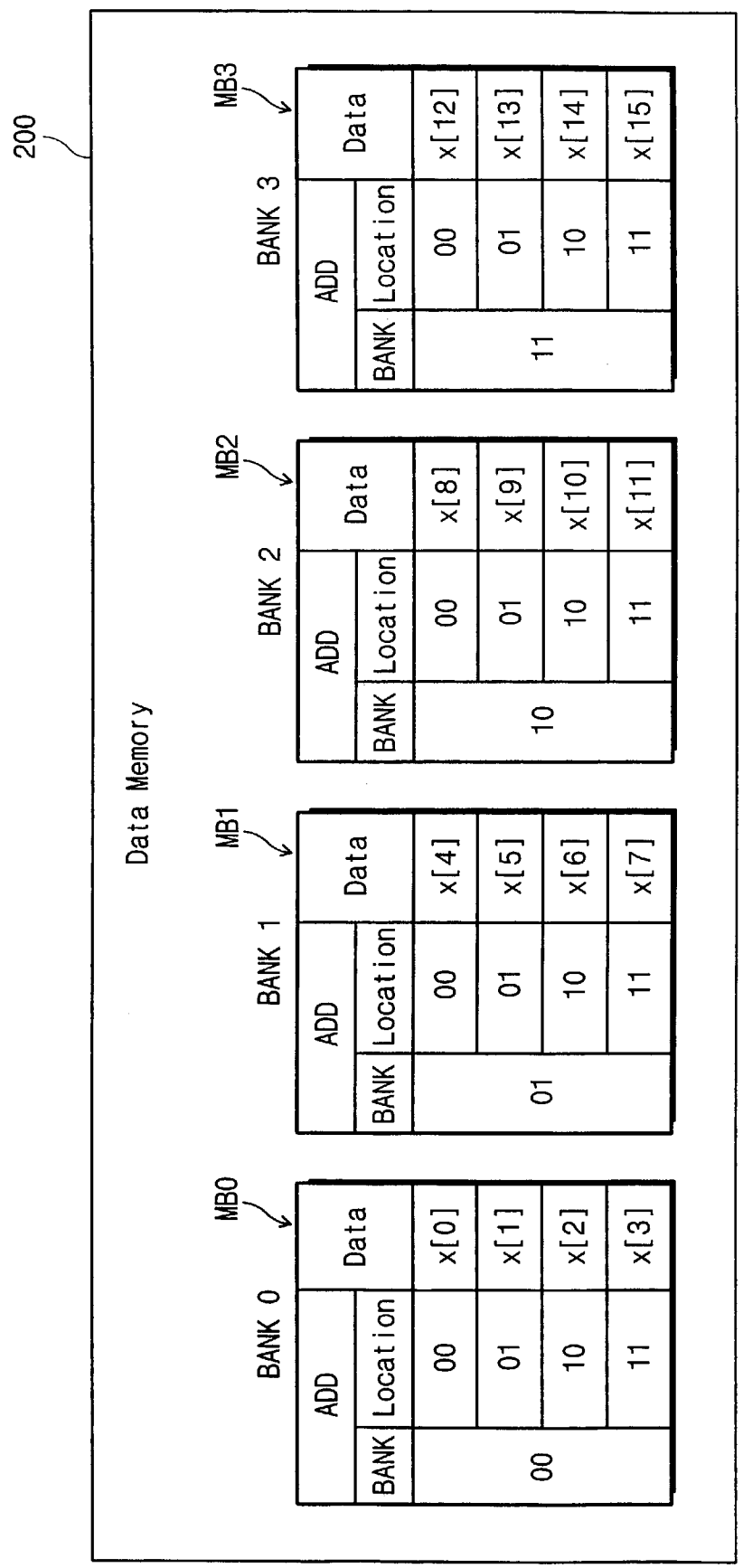
FIG. 6 is an embodiment of a data memory according to the present invention.

FIG. 6 is an exemplary data memory 200 according to the present invention. Referring to FIG. 6, a data memory 200 includes four memory banks, that is, first to fourth banks MB0 to MB3. Preferably, the memory banks MB0 to MB3 are of the same size, order to store four data points, and the same locations of the respective memory banks MB0 to MB3 can be accessed by the same address. Locations of each memory bank are expressed by a binary number, and each address includes a 2-bit bank address and a 2-bit location address. Namely, an address is formed of 4 bits.

Data x[15:0] are stored sequentially from a location of the first memory bank MB0 corresponding to a first address '0000' (a decimal number '0') to a location of the fourth memory bank MB3 corresponding to the last address '1111' (a decimal number '15'). Hereinafter, addresses of each bank are expressed by a decimal number. Data x[0] is stored at a location of the first memory bank MB0 corresponding to address '0', data x[1] at a location of the first memory bank MB0 corresponding to address '1', and data x[15] a location of the fourth memory bank MB3 corresponding to address '15'.

Figure 7A:
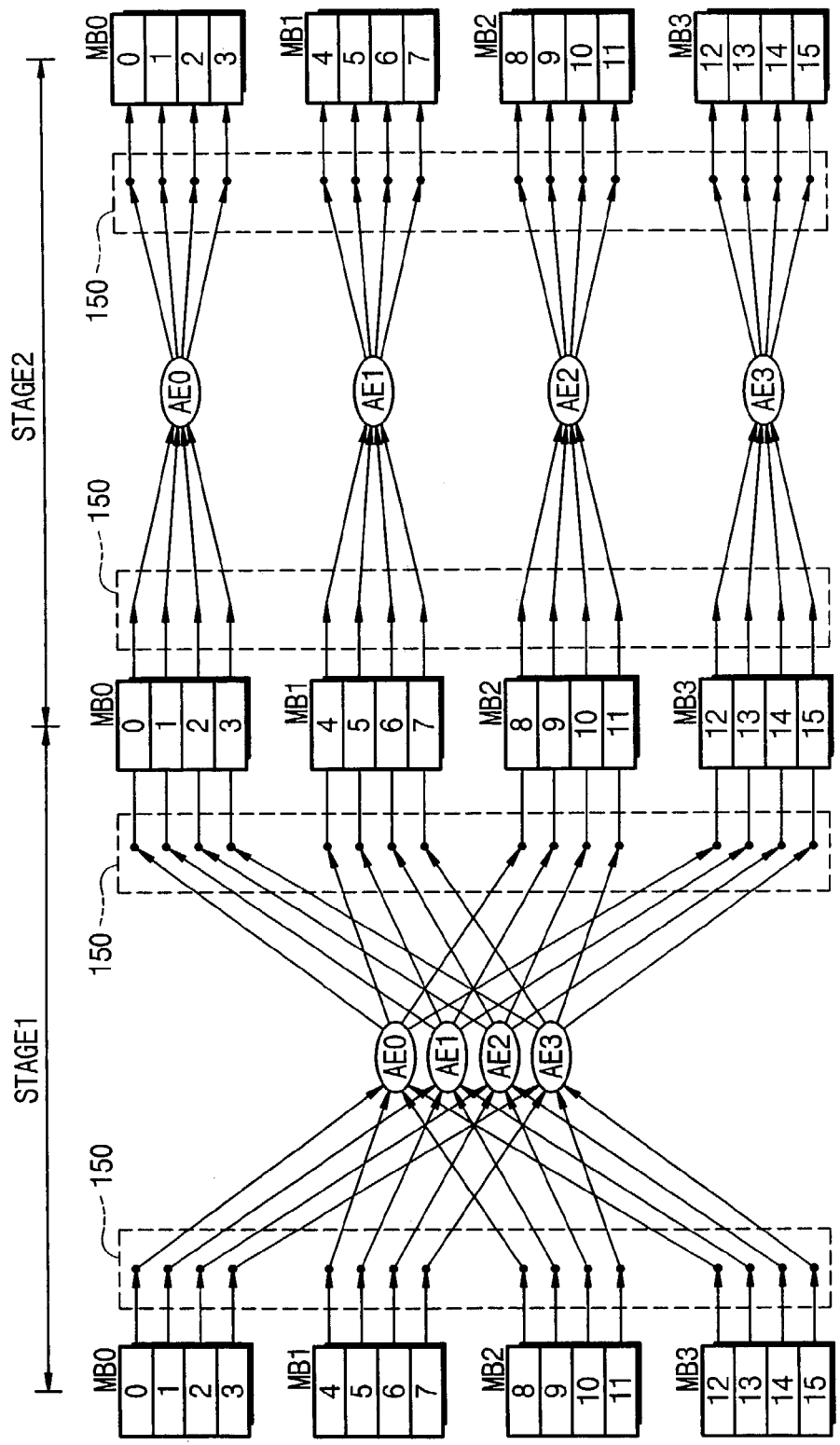
FIG. 7A is a diagram showing data flow according to radix-4 FFT computation with respect to 16 data points.

FIG. 7A shows data flow according to radix-4 FFT computation with respect to 16 data points. Referring to FIG. 7A, decimal numbers written in memory banks MB0 to MB3 indicate addresses of corresponding locations. Radix-4 FFT computation to 16 data points x[15:0] within a time domain includes $\log_R^N$ processing stages, that is, 2 ($\log_4^{16}$) computation stages STAGE1 and STAGE2. 16 data points X[15:0] within a frequency domain are output as a computation result. At each stage, four arithmetic elements AE0 to AE3 receive data from a data memory 200 via a memory interface 250 at the same time and perform FFT computation in parallel.

Figure 7B:
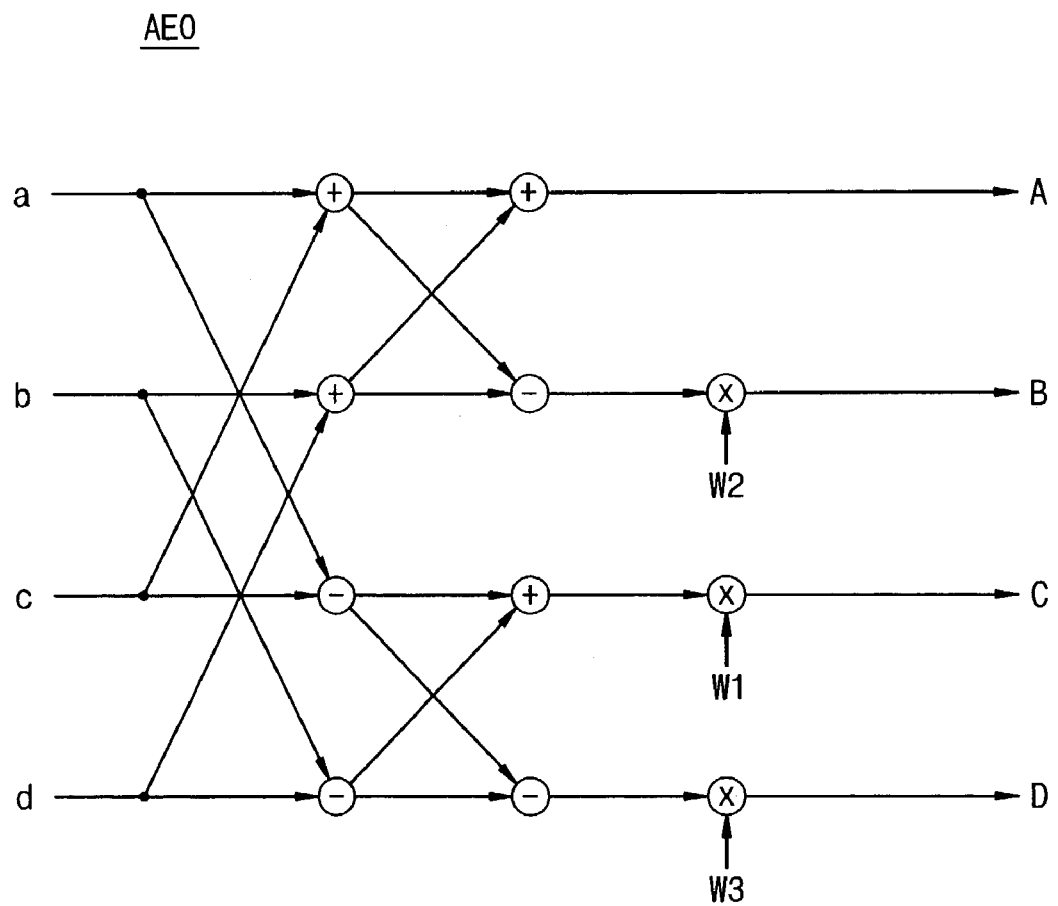
FIG. 7B is an embodiment of the arithmetic element AE0 in FIG. 7A.

A detailed circuit of an arithmetic element AE0 is illustrated in FIG. 7B. Arithmetic elements AE0 to AE3 perform radix-4 butterfly computation and are of the same construction. For this reason, only one arithmetic element AE0 is illustrated in FIG. 7B as an exemplary embodiment. Referring to FIG. 7B, the arithmetic element AE0 performs radix-4 butterfly computation and is formed of eight complex adders and three complex multipliers. In the case where four arithmetic elements AE0 to AE3 are used, 64 complex adders $$\left(\frac{N}{4} \times 8 \times \log_4^N = \frac{16}{4} \times 8 \times \log_4^{16}\right)$$

and 24 complex multipliers $$\left(\frac{N}{4} \times 3 \times \log_4^N = \frac{16}{4} \times 3 \times \log_4^{16}\right)$$

are necessitated to perform radix-4 FFT computation with respect to 16 data points.

Again referring to FIG. 7A, the arithmetic element AE0 receives data at locations of memory banks MB0 to MB3 corresponding to addresses '0', '4', '8', and '12', as its input data. The arithmetic element AE1 receives data at locations of the memory banks MB0 to MB3 corresponding to addresses '1', '5', '9', and '13', as its input data. The arithmetic element AE2 receives data at locations of the memory banks MB0 to MB3 corresponding to addresses '2', '6', '10', and '14', as its input data. The arithmetic element AE3 receives data at locations of the memory banks MB0 to MB3 corresponding to addresses '3', '7', '11', and '15', as its input data. For parallel FFT computation, data stored in the memory banks MB0 to MB3 has to be simultaneously provided to the arithmetic elements AE0 to AE3. But, when data is read out from locations of memory banks MB0 to MB3 corresponding to addresses '0', '4', '8', and '12', it is impossible to read out data from locations of memory banks MB0 to MB3 corresponding to the remaining addresses. Accordingly, arbitration of a memory interface 150 is necessitated to enable all the arithmetic elements AE0 to AE3 to access the memory banks MB0 to MB3 at the same time.

Figure 8A:
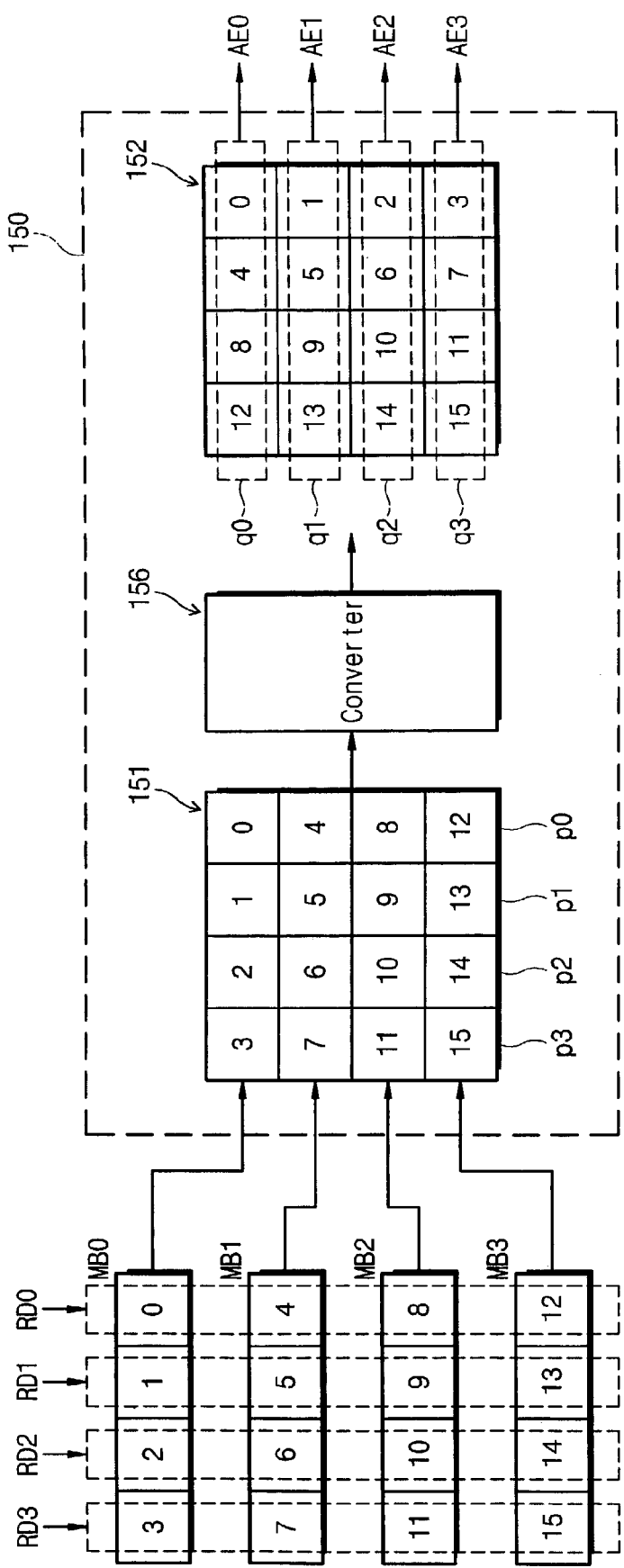
FIG. 8A is a diagram for describing how data read from a data memory is provided to arithmetic elements via a memory interface during a first stage.

FIG. 8A is a diagram for describing the manner in which data read from a data memory 200 is provided to arithmetic elements AE0 to AE3 via a memory interface 150 during a first stage STAGE1. FIG. 8B is a diagram for describing the manner in which results computed by the arithmetic elements AE0 to AE3 are stored in the data memory 200 via the memory interface 150 during the first stage STAGE1.

Referring first to FIG. 8A, the memory interface 150 includes a read matrix 151, an output matrix 152 and a converter 156, and transfers data read from the data memory 200 to the arithmetic elements AE0 to AE3. Each of the read and output matrixes 151 and 152 is formed of a buffer and is R*M in size. Here, N is a memory number and R is an index of radix-R.

The memory interface 150 changes an address value sequentially to '00', '01', '10', and '11' and simultaneously reads out data from locations of memory banks MB0 to MB3 corresponding to each address value. Here, a 2-bit location address is used to read out data from respective memory banks MB0 to MB3.

When the address is '00', data is read out from locations of memory banks MB0 to MB3 corresponding to addresses '0', '4', '8', and '12' and stored at a 0th column p0 of a read matrix 151. When the address is '01', data is read out from locations of memory banks MB0 to MB3 corresponding to addresses '1', '5', '9', and '13' and is stored at a 1st column p1 of the read matrix 151. When the address is '10', data is read out from locations of memory banks MB0 to MB3 corresponding to addresses '2', '6', '10', and '14' and is stored at a 2nd column p2 of the read matrix 151. When the address is '11', data is read out from locations of memory banks MB0 to MB3 corresponding to addresses '3', '7', '11', and '15' and is stored at a 3rd column p3 of the read matrix 151.

When the read matrix 151 of a 4*4 size is filled with data, a converter 156 performs a transpose transform operation. With this matrix transform operation, data in the 0th column p0 of the read matrix 151 is stored at a 0th row q0 of the output matrix 152, data in the 1st column p1 at a 1st row q1 thereof, data in the 2nd column p2 at a 2nd row q2 thereof, and data in the 3rd column p3 at a 3rd row q3 thereof.

Data in respective rows of the output matrix 152 are provided to corresponding arithmetic elements in parallel or at the same time. Namely, data at (q0, p0) is transferred to an arithmetic element AE0, data at (q1, p0) to an arithmetic element AE1, data at (q2, p0) to an arithmetic element AE2, and data at (q3, p0) to an arithmetic element AE3. Data bits in remaining columns may be transferred to corresponding arithmetic elements in the same manner as described above.

The arithmetic elements AE0 to AE3 perform parallel FFT computation with respect to received data. Results computed by the arithmetic elements AE0 to AE3 are stored in an input matrix 153 that illustrated in FIG. 8B. That is, a computed result of the arithmetic element AE0 is stored at a 0th row v0 of the input matrix 153, a computed result of the arithmetic element AE1 at a 1st row v1 of the input matrix 153, a computed result of the arithmetic element AE2 at a 2nd row v2 of the input matrix 153, and a computed result of the arithmetic element AE3 at a 3rd row v3 of the input matrix 153.

If the input matrix 153 is filled with data, a converter 157 performs the above-described transpose transform operation to store data of the input matrix 153 in a write matrix 154. That is, data in a 0th row v0 of the input matrix 153 is stored at a 0th column w0 of the write matrix 154, data in a 1st row v1 of the input matrix 153 is stored at a 1st column w1 of the write matrix 154, data in a 2nd row v2 of the input matrix 153 is stored at a 2nd column w2 of the write matrix 154, and data in a 3rd row v3 of the input matrix 153 is stored at a 3rd column w3 of the write matrix 154.

After the transpose transform operation is completed, data of the write matrix 154 is stored in memory banks MB0 to MB3. Namely, data at the 0th column w0 of the write matrix 154 is stored in locations of memory banks MB0 to MB3 corresponding to address '00'. Data at the 1st column w1 of the write matrix 154 is stored in locations of memory banks MB0 to MB3 corresponding to address '01'. Data at the 2nd column w2 of the write matrix 154 is stored in locations of memory banks MB0 to MB3 corresponding to address '10'. Data at the 3rd column w3 of the write matrix 154 is stored in locations of memory banks MB0 to MB3 corresponding to address '11'. The first stage STAGE1 in FIG. 7A is performed by a set of operations which are described in FIGS. 8A and 8B.

Referring again to FIG. 7A, arithmetic elements AE0 to AE3 of the second stage STAGE2 receive data stored in corresponding memory banks MB0 to MB3, respectively. That is, the arithmetic element AE0 receives data from memory bank MB0, the arithmetic element AE1 receives data from memory bank MB1, the arithmetic element AE2 receives data from memory bank MB2, and the arithmetic element AE3 receives data from memory bank MB3. Accordingly, no transpose transform operation is necessitated during the second stage STAGE2.

Figure 9A:
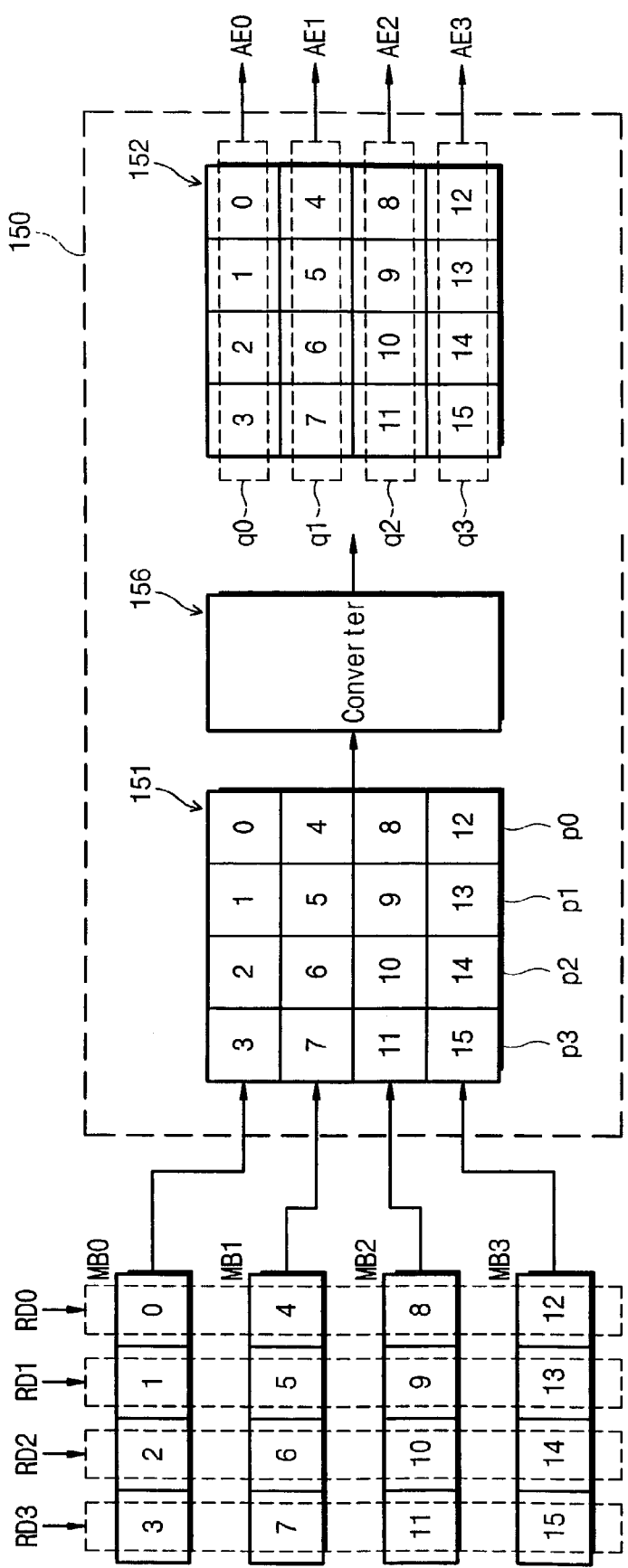
FIG. 9A is a diagram for describing how data read out from a data memory is provided to arithmetic elements via a memory interface during a second stage.
Figure 9B:
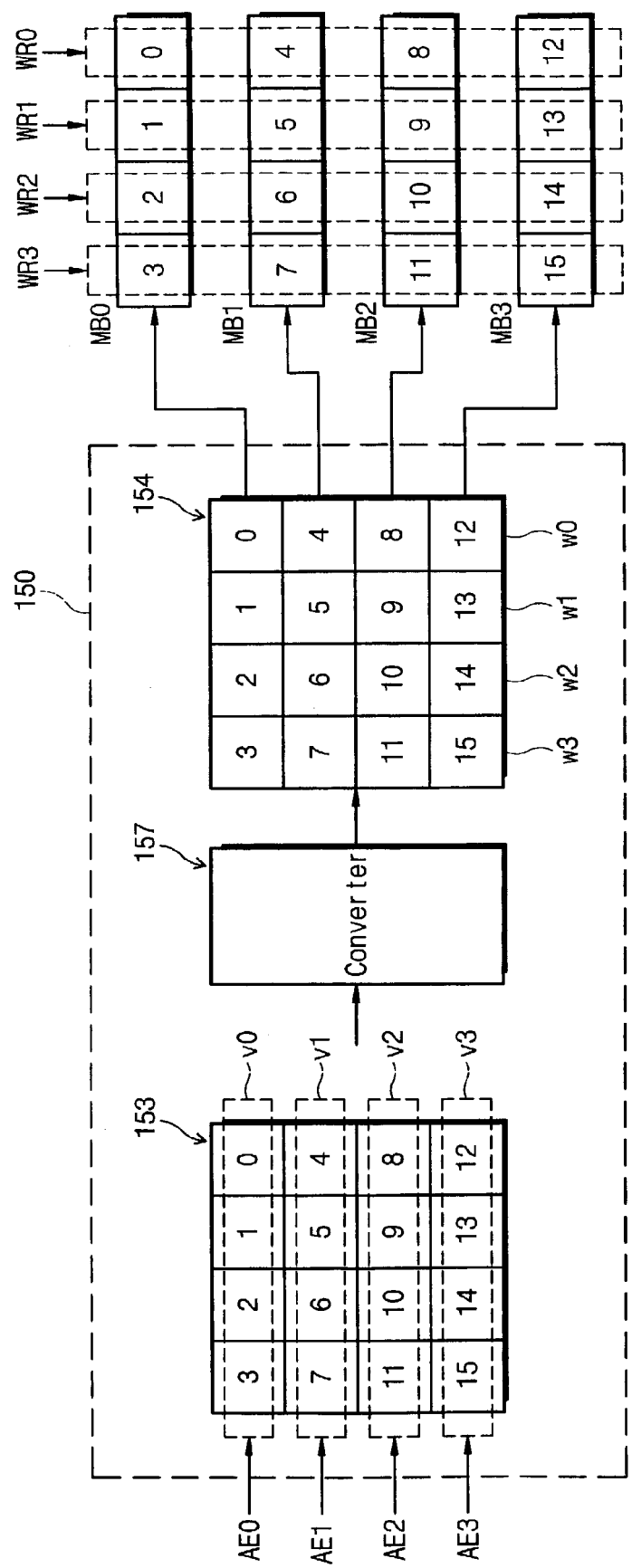
FIG. 9B is a diagram for describing how results computed by the arithmetic elements are stored in the data memory via the memory interface during the second stage.

FIG. 9A is a diagram for describing the manner in which data read out from a data memory 200 is provided to arithmetic elements AE0 to AE3 via a memory interface 150 during the second stage STAGE2 of FIG. 7A. FIG. 9B is a diagram for describing the manner in which results computed by the arithmetic elements AE0 to AE3 are stored in the data memory 200 via the memory interface 150 during the second stage STAGE2.

Referring to FIG. 9A, the memory interface 150 changes the address value sequentially to '00', '01', '10', and '11' and simultaneously reads out data from locations of memory banks MB0 to MB3 corresponding to the address. When the address is '00', the memory interface 150 reads out data from locations (0, 4, 8, and 12) of memory banks MB0 to MB3 corresponding to the address '00'. Data thus read from the locations (0, 4, 8, and 12) is stored in a read matrix 151, namely, at a 0th column p0 thereof. When the address is '01', the memory interface 150 reads out data from locations (1, 5, 9, and 13) of the memory banks MB0 to MB3 corresponding to the address '01'. Data thus read from the locations (1, 5, 9, and 13) is stored in the read matrix 151, namely, at a 1st column p1 thereof. When the address is '10', the memory interface 150 reads out data from locations (2, 6, 10, and 14) of the memory banks MB0 to MB3 corresponding to the address '10'. Data thus read from the locations (2, 6, 10, and 14) is stored in the read matrix 151, namely, at a 2nd column p2 thereof. When an address is '11', the memory interface 150 reads out data from locations (3, 7, 11, and 15) of memory banks MB0 to MB3 corresponding to the address '11'. Data thus read from the locations (3, 7, 11, and 15) is stored in the read matrix 151, namely, at a 3rd column p3 thereof.

Here, unlike the first stage ATAGE1, arithmetic elements AE0 to AE3 receive data from corresponding memory banks MB0 to MB3 during the second stage ATAGE2, thus requiring no transpose transform. For this reason, the converter 156 stores data of the read matrix 151 in an output matrix 152 without modification. Data in respective rows of the output matrix 152 are provided to corresponding arithmetic elements in parallel or at the same time. Namely, data in a 0th row q0 of the matrix 152 is transferred to arithmetic element AE0, data in a 1st row q1 to arithmetic element AE1, data in a 2nd row q2 to arithmetic element AE2, and data in a 3rd row q3 to arithmetic element AE3.

The arithmetic elements AE0 to AE3 perform parallel FFT computation with respect to received data. Results computed by the elements AE0 to AE3 are stored in corresponding rows v0 to v3 of an input matrix 153 shown in FIG. 9B, respectively. That is, a computed result of the arithmetic element AE0 is stored in a 0th row v0 of the input matrix 153, a computed result of the arithmetic element AE1 in a 1st row v1, a computed result of the arithmetic element AE2 in a 2nd row v2, and a computed result of the arithmetic element AE3 in a 3rd row v3.

If the input matrix 153 is filled with data, converter 157 reads out data from the input matrix 153 and then stores read data in a write matrix 154 without modification. Data in the write matrix 154 is stored in memory banks MB0 to MB3. In particular, data in a 0th column w0 of the write matrix 156 is stored at locations of the memory banks MB0 to MB3 corresponding to address '00', data in a 1st column w1 at locations of the memory banks MB0 to MB3 corresponding to address '01', data in a 2nd column w0 is stored in locations of the memory banks MB0 to MB3 corresponding to address '10', and data in a 0th column w0 at locations of the memory banks MB0 to MB3 corresponding to address '11'. The second stage STAGE2 shown in FIG. 7A is performed according to the procedures illustrated in FIGS. 9A and 9B.

In FIGS. 6 to 9, a data converter 100 is shown which performs radix-4 FFT computation in parallel with respect to 16 data points by use of four arithmetic elements. In the case of performing radix-4 FFT computation in parallel with respect to N data points by use of four arithmetic elements, data stored in memory banks MB0 to MB3 is as follows.

TABLE 1

| | |
|---|---|
| MB0 | $0, 1, 2, 3, 4, 5, 6, \ldots, \frac{N}{4} - 1$ |
| MB1 | $\frac{N}{4}, \frac{N}{4}+1, \frac{N}{4}+2, \frac{N}{4}+3, \frac{N}{4}+4, \frac{N}{4}+5, \frac{N}{4}+6, \ldots, \frac{N}{2} - 1$ |
| MB2 | $\frac{N}{2}, \frac{N}{4}+1, \frac{N}{2}+2, \frac{N}{2}+3, \frac{N}{2}+4, \frac{N}{2}+5, \frac{N}{2}+6, \ldots, \frac{3N}{4} - 1$ |
| MB3 | $\frac{3N}{4}, \frac{3N}{4}+1, \frac{3N}{4}+2, \frac{3N}{4}+3, \frac{3N}{4}+4, \frac{3N}{4}+5, \frac{3N}{4}+6, \ldots, N-1$ |

Once FFT computation commences, data $$\left(0, \frac{N}{4}, \frac{N}{2}, \text{ and } \frac{3N}{4}\right)$$

is transferred to arithmetic element AE0, data $$\left(1, \frac{N}{4}+1, \frac{N}{4}+1, \frac{3N}{4}+1\right)$$

to arithmetic element AE1, data $$\left(2, \frac{N}{4}+2, \frac{N}{2}+2, \frac{3N}{4}+2\right)$$

to arithmetic element AE2, and data $$\left(3, \frac{N}{4}+3, \frac{N}{2}+3, \frac{3N}{4}+3\right)$$

to arithmetic element AE3. When the radix-4 FFT computation is completed with respect to received data to the elements AE0 to AE3, next data is provided to the arithmetic elements AE0 to AE3. That is, data $$\left(4, \frac{N}{4}+4, \frac{N}{2}+4, \frac{3N}{4}+4\right)$$

is provided to arithmetic element AE0, data $$\left(5, \frac{N}{4}+5, \frac{N}{2}+5, \frac{3N}{4}+5\right)$$

to arithmetic element AE1, data $$\left(6, \frac{N}{4}+6, \frac{N}{2}+6, \frac{3N}{4}+6\right)$$

to arithmetic element AE2, and data $$\left(7, \frac{N}{4}+7, \frac{N}{2}+7, \frac{3N}{4}+7\right)$$

to arithmetic element AE3.

As set forth above, a data transform system according to the present invention performs a radix-4 FFT transform with respect to 16 data points using four arithmetic elements. The procedures illustrated in FIGS. 8 and 9 are repeated 128 times for radix-4 FFT computation with respect to 2048 data points.

FIG. 10 shows a table, in which data indexes before and after FFT computation are tabulated when a data memory is divided into four memory banks MB0 to MB3 each storing four data elements, according to the present invention. Firstly, time domain data x[15:0] is sequentially stored in memory banks MB0 to MB3. After radix-4 FFT computation, frequency domain data X[15:0] is stored in the memory banks MB0 to MB3 in a reversed-bit order. A reversed version of address bits of each location become an index of data stored at this location.

When N data are fully stored in memory banks MB0 to MB3 that form N storage locations, the bit order of the output address is reversed to read out FFT-computed results sequentially from X[0] to X[15]. Meanwhile, when N data is stored in memory banks MB0 to MB3 that form K storage locations (K>N), generation of the output address is different from that described above. This process will be described below.

FIG. 11 shows a table, in which data indexes before and after FFT computation are tabulated when a data memory having $2^5$ storage locations is divided into four memory banks MB0 to MB3 and $2^5$ data bits are stored in each memory bank.

Firstly, time domain data x[$2^5-1$:0] is stored at locations of memory banks MB0 to MB3 corresponding to an address that is sequentially changed from '00000000000' to '00000011111'. After radix-4 FFT computation, frequency domain data X[$2^5-1$:0] is stored in the memory banks MB0 to MB3 in a reversed bit order. Unlike the example illustrated in FIG. 10, an index of data stored at each location does not have a reversed order of address bits of each location.

Figure 12:
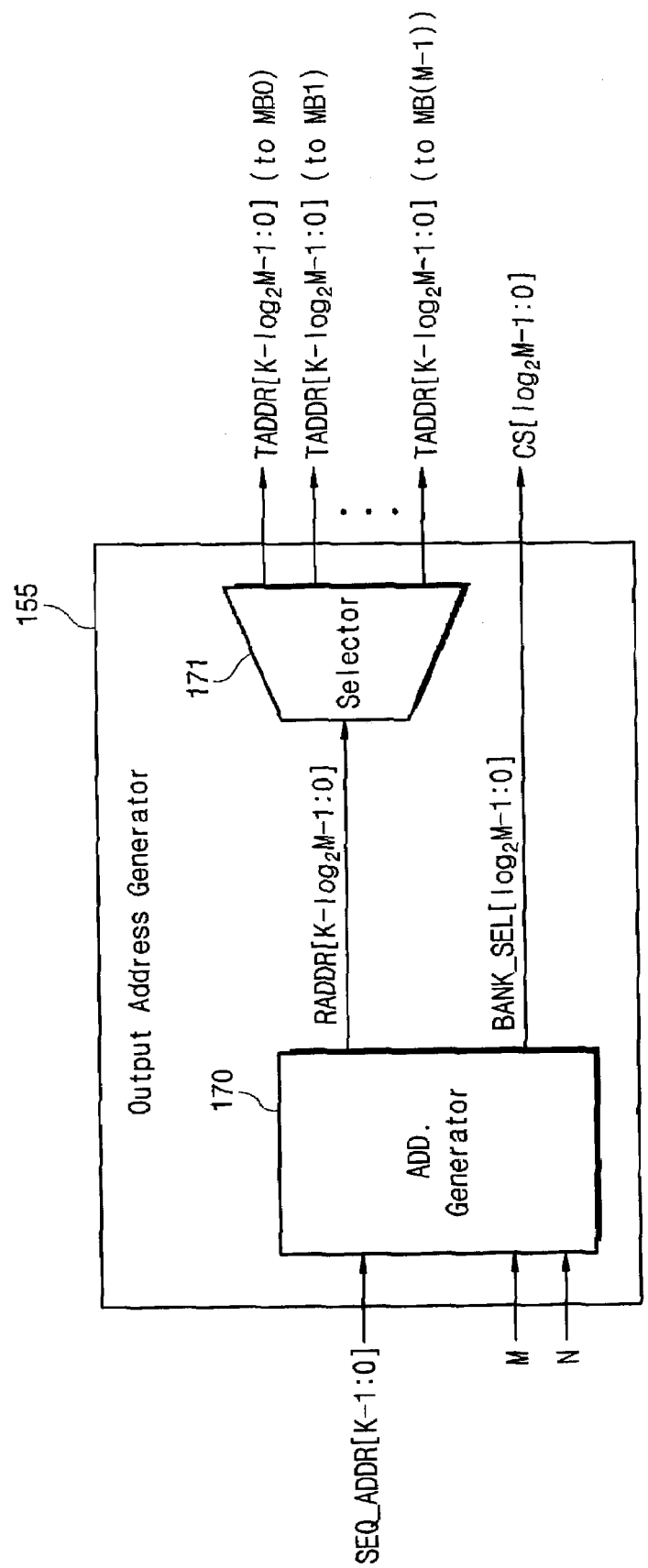
FIG. 12 is an embodiment of an output address generator in FIG. 5.

FIG. 12 shows an exemplary output address generator according to the present invention. An output address generator 155 in FIG. 12 is intended to output data after FFT computation sequentially to memory banks when a data memory having $2^K$ storage locations is divided into M memory banks. Referring to FIG. 12, the output address generator 155 includes an address generator 170 and a selector 171. An operation of the output address generator 155 will be more fully described with reference to FIG. 13 below, which shows the conceptual operation thereof under the assumption of K=11, M=4, and N=$2^5$ based on the example illustrated in FIG. 11.

Figure 13:
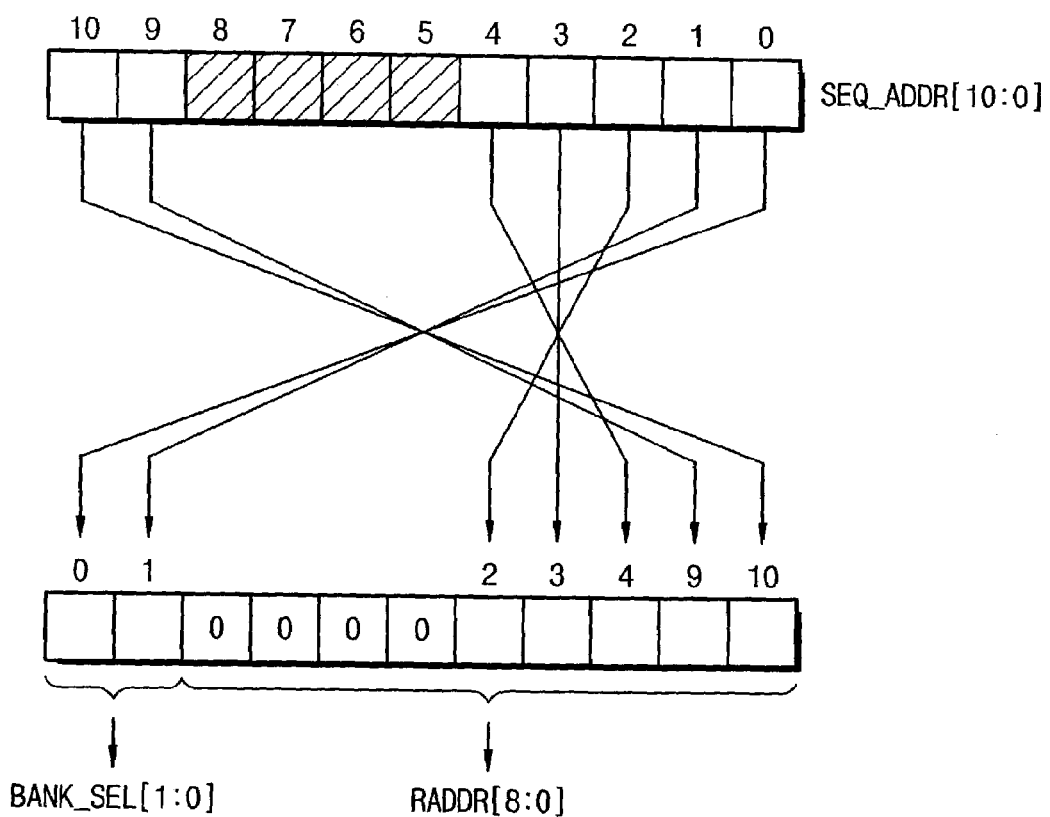
FIG. 13 is a diagram showing a conceptual operation thereof under the assumption of K=11, M=4, and N=$2^5$ based on an example illustrated in FIG. 11.

Referring to FIGS. 12 and 13, a read address SEQ_ADDR[10:0] from a memory interface 150 is formed of a bank address SEQ_ADDR[10:9] and a location address SEQ_ADDR[8:0]. As illustrated in FIG. 11, no data is written at locations of each memory bank corresponding to '000100000'–'111111111'. Accordingly, address bits SEQ_ADDR[8:5] of the read address SEQ_ADDR[10:0] are always '0000'. In other words, no data is written at storage locations corresponding to a read address SEQ_ADDR[8:5] of '1111'. With this condition, the address generator 170 arranges remaining address bits except for the address bits SEQ_ADDR[8:5] in a reversed order, and outputs the two most significant bits of the reversely arranged address bits as a bank address BANK_SEL[1:0], and remaining bits thereof as a location address RADDR[8:0].

Referring again to FIG. 12, the address generator 170 receives K read address bits SEQ_ADDR[K–1:0], a memory bank number N, and a data point number N and outputs a bank address $$BANK\_SEL[\log_2^M - 1:0]$$

and a location address $$RADDR[K - \log_2^M - 1:0].$$

The selector 171 outputs an address $$TADDR[K - \log_2^M - 1:0]$$

to a bank corresponding to the bank address $$BANK\_SEL[\log_2^M - 1:0],$$

which is provided to M memory banks as a chip select signal $$CS[\log_2^M - 1:0].$$

As will be seen from the above description, $$\log_M^N$$

stages are necessitated to perform radix-R FFT computation with respect to N data points using M arithmetic elements. If N is the Xth power of M (N=$M^X$), X stages are necessitated. If N is not the Xth power of M (N=$M^X$*Y, Y is an even number less than M), (X+1) stages are necessitated. Below, there will be described an example when N is $M^X$*Y (Y is an even number less than M).

Figure 14:
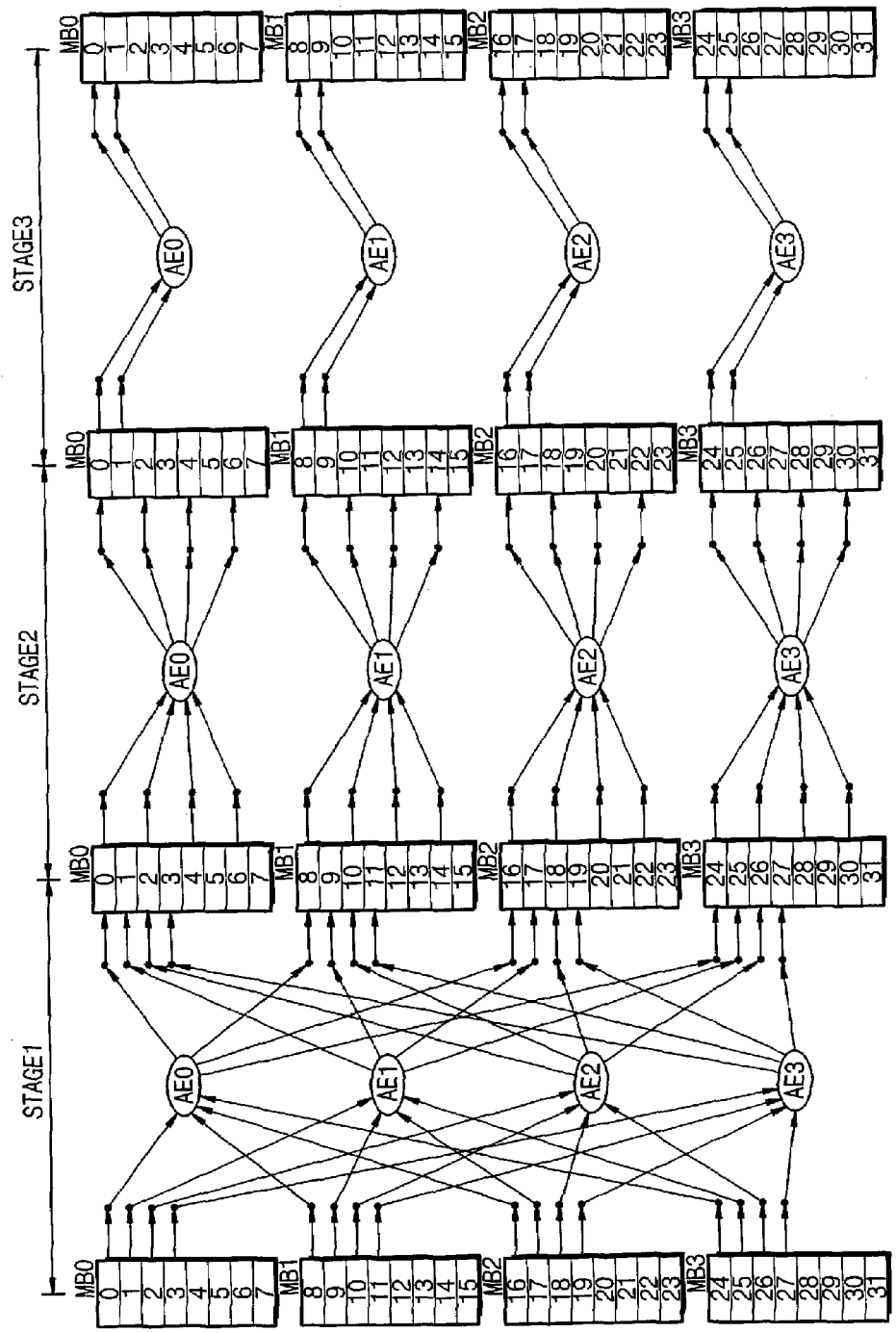
FIG. 14 is a diagram for describing radix-4 FFT computation with respect to 32 data points using four arithmetic elements.

FIG. 14 is a diagram for describing radix-4 FFT computation with respect to 32 data points using four arithmetic elements. When R=M=4 and N=32, $$N = \log_4^{32} = \log_4^{4^2} \times 2.$$

That is, three stages are necessitated. Here, arithmetic elements AE0 to AE3 of first and second stages STAGE1 and STAGE2 perform radix-4 FFT computation, while those of a third stage STAGE3 perform radix-2 FFT computation.

During the first stage STAGE1 in FIG. 14, an operation of reading/writing data from/to a data memory is carried out by procedures illustrated in FIGS. 8A and 8B. During the second and third stages STAGE2 and STAGE3, this operation is performed by the procedures illustrated ad described above with reference to FIGS. 9A and 9B.

Second Embodiment

Figure 15:
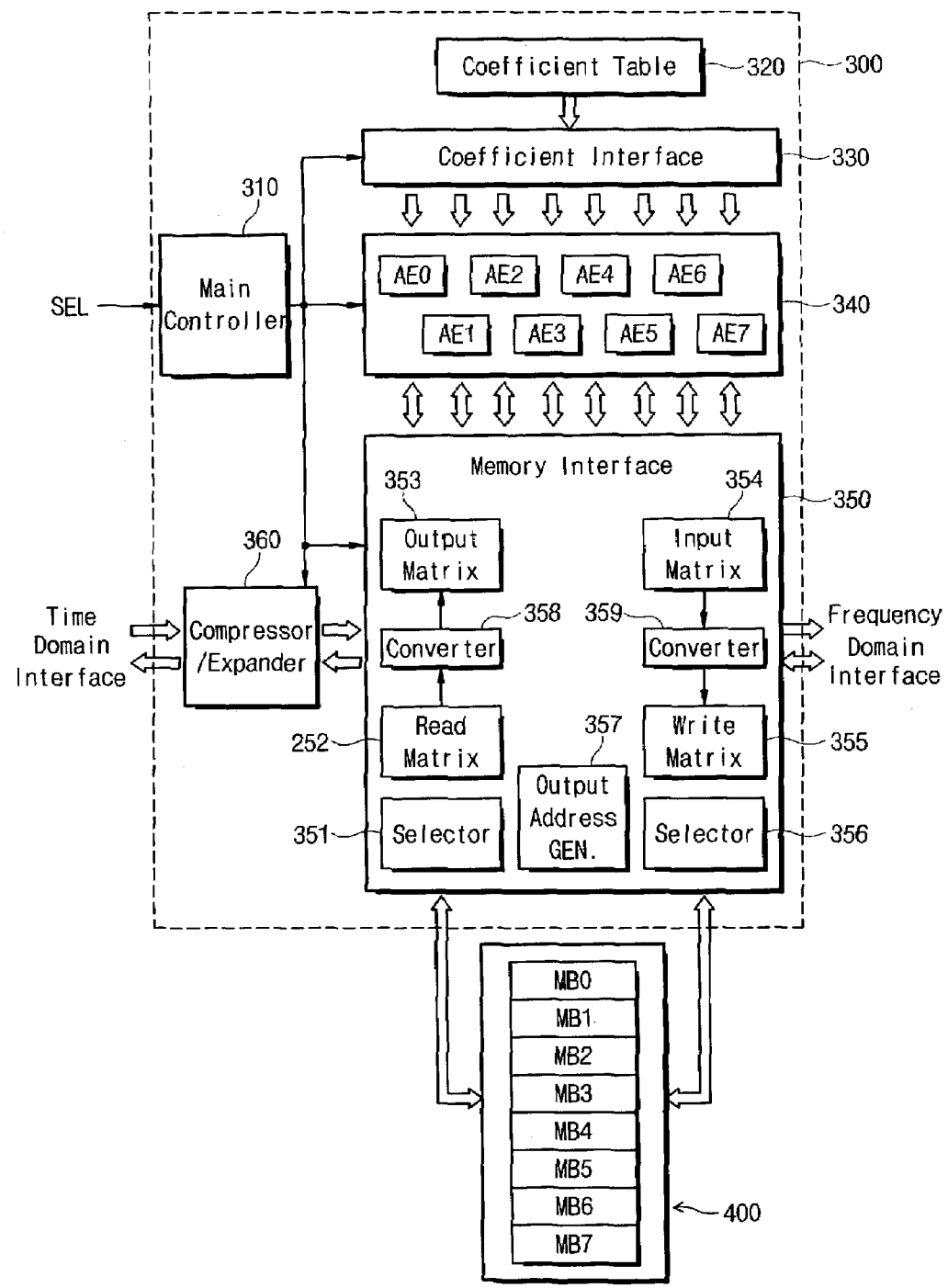
FIG. 15 is a block diagram of a data transform system according to a second embodiment of the present invention.

FIG. 15 is another example of a data transform system according to the present invention. The data transform system 300 in FIG. 15 is intended to perform radix-R FFT/IFFT computation with respect to N data points using M arithmetic elements. Here, R is different from M. The data transform system 300 is identical to that in FIG. 5 except that a memory interface 350 further includes selectors 351 and 358 and four arithmetic elements AE4 to AE7 and that a data memory 400 is divided into eight memory banks MB0 to MB7. The data transform system 300 according to the present invention will be more fully described below.

Figure 16A:
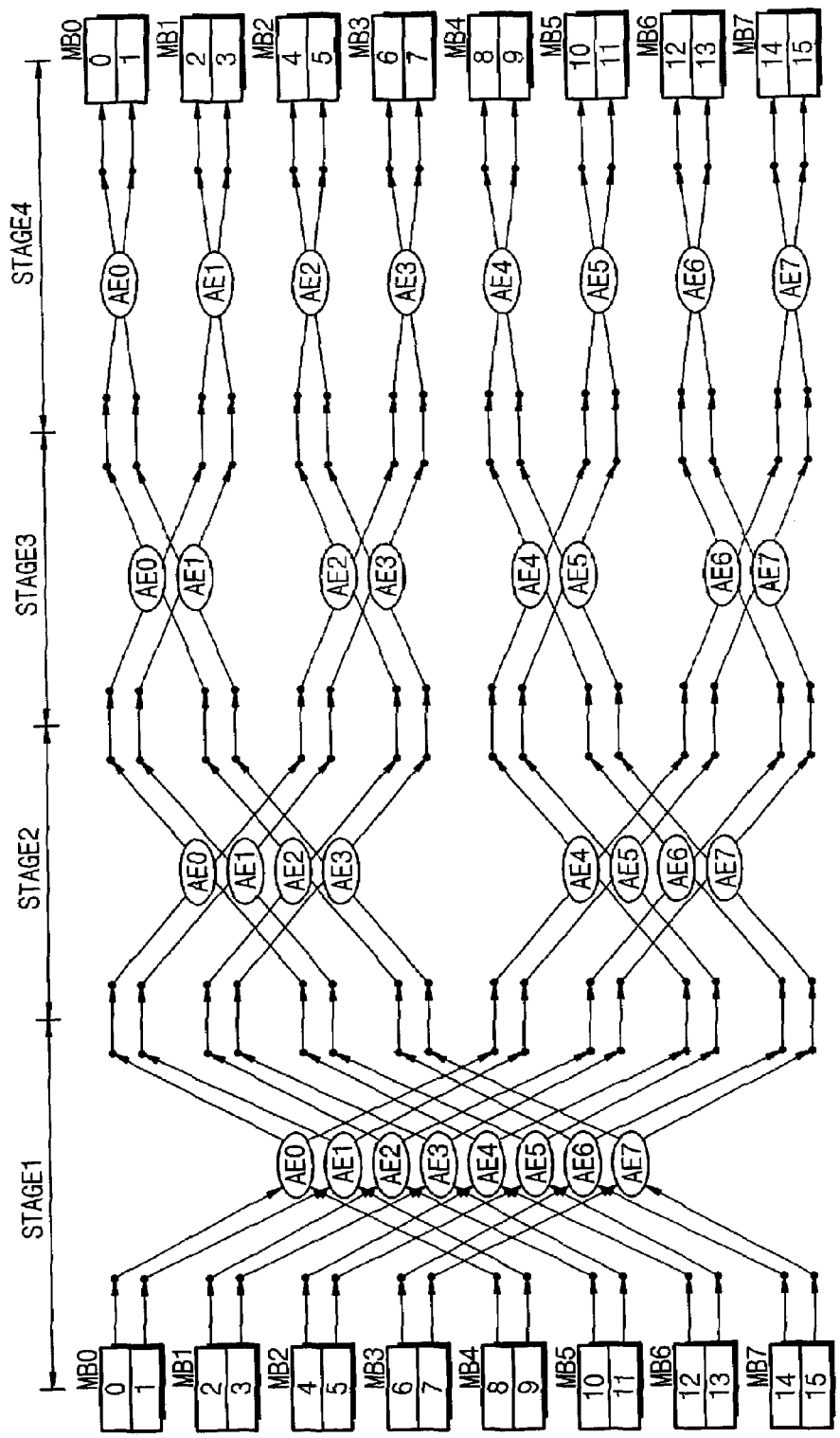
FIG. 16A is a diagram for describing how radix-2 FFT computation is performed with respect to 16 data points using 8 arithmetic elements.

FIG. 16A is a diagram for describing how radix-2 FFT computation is performed with respect to 16 data points using 8 arithmetic elements. Referring to FIG. 16A, four stages ($\log_2^6$) STAGE1 to STAGE4 are necessitated to perform radix-2 FFT computation with respect to 16 data points. At each stage, each of arithmetic elements AE0 to AE7 receives 2 data bits from data memory 400. For example, the arithmetic element AE0 receives data from a location of memory bank MB0 corresponding to address '0' and data from a location of memory bank MB4 corresponding to address '8'. The arithmetic element AE1 receives data from a location of the memory bank MB0 corresponding to address '1' and data from a location of the memory bank MB4 corresponding to address '9'. The arithmetic element AE2 receives data from a location of memory bank MB1 corresponding to address '2' and data from a location of memory bank MB5 corresponding to address '10'. The arithmetic element AE3 receives data from a location of memory bank MB1 corresponding to address '3' and data from a location of memory bank MB5 corresponding to address '11'. The arithmetic element AE4 receives data from a location of memory bank MB2 corresponding to address '4' and data from a location of memory bank MB6 corresponding to address '12'. The arithmetic element AE5 receives data from a location of the memory bank MB2 corresponding to address '5' and data from a location of the memory bank MB6 corresponding to address '13'. The arithmetic element AE6 receives data from a location of memory bank MB3 corresponding to address '6' and data from a location of a memory bank MB7 corresponding to address '14'. The arithmetic element AE7 receives data from a location of the memory bank MB3 corresponding to address '7' and data from a location of the memory bank MB7 corresponding to address '15'. Data will be transferred to arithmetic elements AE0 to AE7 of each of remaining stages according to the illustration of FIG. 16A.

Figure 16B:
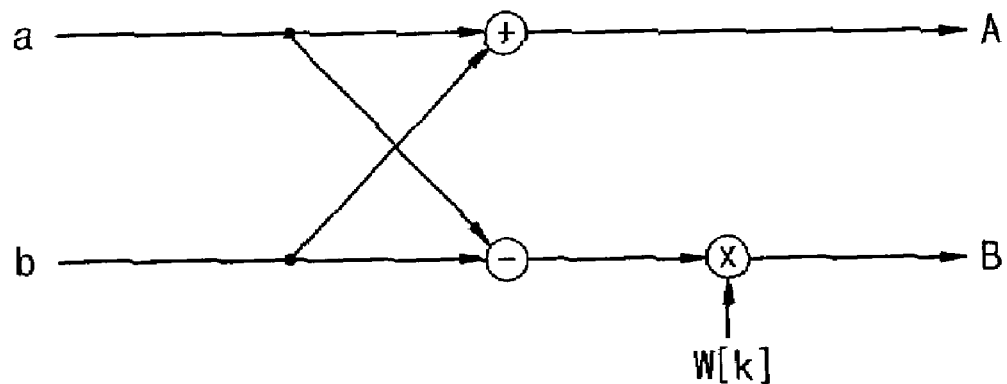
FIG. 16B is an embodiment of an arithmetic element AE0 illustrated in FIG. 16A.

FIG. 16B is an exemplary arithmetic element AE0 illustrated in FIG. 16A. Since arithmetic elements AE0 to AE7 for radix-4 butterfly computation are configured the same, only one arithmetic element AE0 is illustrated in FIG. 16B. Referring to FIG. 16B, an arithmetic element AE0 performs radix-4 butterfly computation and includes two complex adders and one complex multiplier. During the first stage ATAGE1, firstly, the arithmetic element AE0 adds 0th data stored in a memory bank MB0 and 8th data stored in a memory bank MB4, and stores the added result at a location of the memory bank MB0 corresponding to address '0'. Secondly, the arithmetic element AE0 multiplies the 0th data of bank MB0 and the 8th data of bank MB4, and stores the multiplied result at the location of memory bank MB4 corresponding to an address '8'.

Figure 17A:
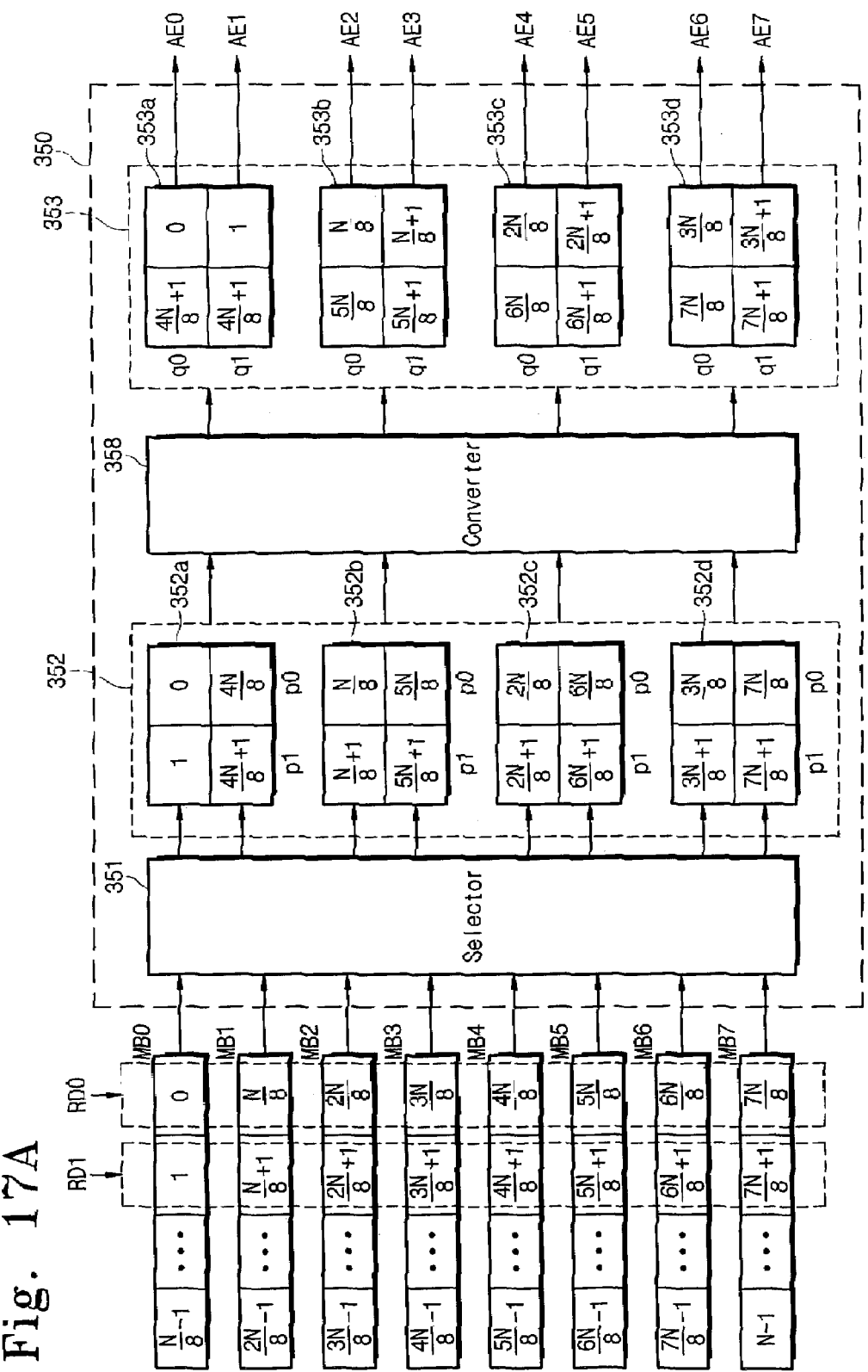
FIG. 17A is a diagram for describing how data is read out from a data memory and provided to arithmetic elements via a memory interface during a first stage.

FIG. 17A is a diagram for describing how data is read out from a data memory 400 and provided to arithmetic elements AE0 to AE7 via a memory interface 350, during a first stage STAGE1. In this disclosed embodiment, FIG. 17A shows a generalized model, where the data stored in the data memory 400 is not limited to 16.

Referring to FIG. 17A, the memory interface 350 includes a selector 351, a read matrix array 352, an output matrix array 353, and a converter 358. The read matrix array 352 is formed of $$\frac{M}{R}$$

read matrixes 352a to 352d (in this embodiment, 4), each of which has an R*R size (in this embodiment, R=2). The output matrix array 353 is formed of $$\frac{M}{R}$$

output matrixes 353a to 353d (in this embodiment, 4), each of which has an R*R size (in this embodiment, R=2).

Once radix-2 FFT computation commences, the memory interface 350 reads out data from locations of memory banks MB0 to MB7 each corresponding to a LSB address bit '0' at the same time. The selector 351 is supplied with data read out from locations of the banks MB0 to MB7 each corresponding to addresses $$\left(0, \frac{N}{8}, \frac{2N}{8}, \frac{3N}{8}, \frac{4N}{8}, \frac{5N}{8}, \frac{6N}{8}, \text{and } \frac{7N}{8}\right).$$

The selector 351 stores data from banks MB0 and MB4 in a 0th column p0 of the read matrix 352a, data from banks MB1 and MB5 in a 0th column p0 of the read matrix 352b, data from banks MB2 and MB6 in a 0th column p0 of the read matrix 352c, and data from banks MB3 and MB7 in a 0th column p0 of the read matrix 352d. Similarly, the memory interface 350 reads out data from locations of memory banks MB0 to MB7 each corresponding to a LSB address bit '1' at the same time. The selector 351 is supplied with data read out from locations of the banks MB0 to MB7 each corresponding to addresses $(1, \frac{N}{8}+1, \frac{2N}{8}+1, \frac{3N}{8}+1, \frac{4N}{8}+1, \frac{5N}{8}+1, \frac{6N}{8}+1, \text{ and } \frac{7N}{8}+1)$.

The selector 351 stores data from banks MB0 and MB4 in a 1st column p1 of the read matrix 352a, data from banks MB1 and MB5 in a 1st column p1 of the read matrix 352b, data from banks MB2 and MB6 in a 1st gcolumn p1 of the read matrix 352c, and data from banks MB3 and MB7 in a 1st column p1 of the read matrix 352d.

The converter 358 performs a transpose transform with respect to the read matrix array 352 and stores resultant data in the output matrix array 353. Data in 0th and 1st columns p0 and p1 of the read matrix 352a are stored in 0th and 1st rows q0 and q1 of the output matrix 353a, and data in 0th and 1st columns p0 and p1 of the read matrix 352b are stored in 0th and 1st rows q0 and q1 of the output matrix 353b. Data in 0th and 1st columns p0 and p1 of the read matrix 352c are stored in 0th and 1st rows q0 and q1 of the output matrix 353c, and data in 0th and 1st columns p0 and p1 of the read matrix 352d are stored in 0th and 1st rows q0 and q1 of the output matrix 353d.

Data in respective rows of the output matrixes 353a to 353d are provided to corresponding arithmetic elements at the same time or in parallel. That is, data in a 0th row q0 of the output matrix 353a are transferred to arithmetic element AE0, data in a 1st row q1 of the output matrix 353a to arithmetic element AE1, data in a 0th row q0 of the output matrix 353b to arithmetic element AE2, data in a 1st row q1 of the output matrix 353b to arithmetic element AE3, data in a 0th row q0 of the output matrix 353c to arithmetic element AE4, data in a 1st row q1 of the output matrix 353c to arithmetic element AE5, data in a 0th row q0 of the output matrix 353d to arithmetic element AE6, and data in a 1st row q1 of the output matrix 353d to arithmetic element AE7. The arithmetic elements AE0 to AE7 perform parallel FFT computation with respect to the received data.

Figure 17B:
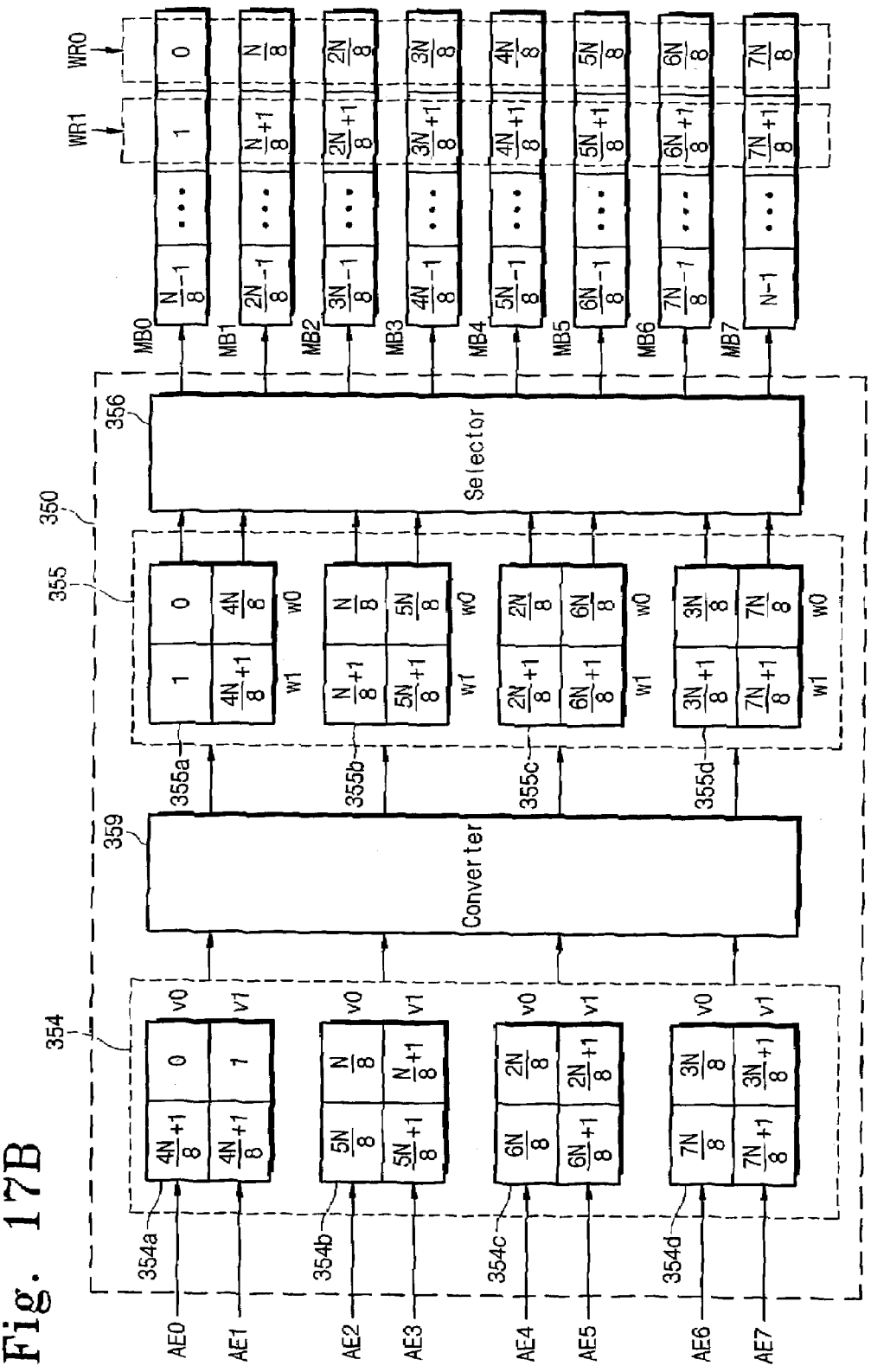
FIG. 17B is a diagram for describing how results computed by arithmetic elements during the first stage in FIG. 17A are stored in a data memory.

FIG. 17B is a diagram for describing the manner in which results computed by arithmetic elements AE0 to AE7 during the first stage in FIG. 17A are stored in a data memory 400. A memory interface 350 stores computed results by arithmetic elements AE0 to AE7 in data memory 400 and includes an input matrix array 354, a write matrix array 355, a selector 356, and a converter 359.

Outputs from arithmetic elements AE0 to AE7 are stored in the input matrix array 354 formed of four input matrixes 354a to 354d. Namely, an output of the arithmetic element AE0 is stored in a 0th row v0 of input matrix 354a, an output of the arithmetic element AE1 in a 1st row v1 of input matrix 354a, an output of the arithmetic element AE2 in a 0th row v0 of input matrix 354b, an output of the arithmetic element AE3 in a 1st row v1 of input matrix 354b, an output of the arithmetic element AE4 in a 0th row v0 of input matrix 354c, an output of the arithmetic element AE5 in a 1st row v1 of input matrix 354c, an output of the arithmetic element AE6 in a 0th row v0 of input matrix 354c, and an output of the arithmetic element AE7 in a 1st row v1 of input matrix 354d.

The converter 359 performs a transpose transform with respect to data in the input matrixes 354a to 354d and stores resultant data in the write matrix array 355 formed of four write matrixes 354a to 354d. In particular, values in 0th and 1st rows v0 and v1 of the input matrix 353a are stored in 0th and 1st columns w0 and w1 of output matrix 354a, values in 0th and 1st rows v0 and v1 of the input matrix 353b in 0th and 1st columns w0 and w1 of output matrix 354b, values in 0th and 1st rows v0 and v1 of the input matrix 353c in 0th and 1st columns w0 and w1 of output matrix 354c, and values in 0th and 1st rows v0 and v1 of the input matrix 353d in 0th and 1st columns w0 and w1 of output matrix 354d.

The selector 356 stores data in a 0th column of the respective write matrixes 355a to 355d at locations of memory banks MB0 to MB7 corresponding to address '0'. And then, data in a 1st column of the respective write matrixes 355a to 355d is stored at locations of the memory banks MB0 to MB7 corresponding to address '1'.

The first stage STAGE1 in FIG. 16A is carried out via the procedures illustrated in FIGS. 17A and 17B, and the second stage STAGE2 in FIG. 16A is performed in manner similar to that of the first stage in FIGS. 17A and 17B. The following table 2 shows addresses for read matrixes 352a to 352d and addresses for output matrixes 354a to 354d, during the second stage of radix-2 FFT computation with respect to N data points.

TABLE 2

| READ MATRIX | | | OUTPUT MATRIX | | |
|---|---|---|---|---|---|
| 352a | 1 | 0 | 354a | $\frac{2N}{8}$ | 0 |
| | $\frac{2N}{8}+1$ | $\frac{2N}{8}$ | | $\frac{2N}{8}+1$ | 1 |
| 352b | $\frac{N}{8}+1$ | $\frac{N}{8}$ | 354b | $\frac{3N}{8}$ | $\frac{N}{8}$ |
| | $\frac{3N}{8}+1$ | $\frac{3N}{8}$ | | $\frac{3N}{8}+1$ | $\frac{N}{8}+1$ |
| 352c | $\frac{4N}{8}+1$ | $\frac{4N}{8}$ | 354c | $\frac{6N}{8}$ | $\frac{4N}{8}$ |
| | $\frac{6N}{8}+1$ | $\frac{6N}{8}$ | | $\frac{6N}{8}+1$ | $\frac{4N}{8}+1$ |
| 352d | $\frac{5N}{8}+1$ | $\frac{5N}{8}$ | 354d | $\frac{7N}{8}$ | $\frac{5N}{8}$ |
| | $\frac{7N}{8}+1$ | $\frac{7N}{8}$ | | $\frac{7N}{8}+1$ | $\frac{5N}{8}+1$ |

The following table 3 shows addresses for read matrixes 352a to 352d and addresses for output matrixes 354a to 354d, during the third stage of radix-2 FFT computation with respect to N data points.

TABLE 3

| READ MATRIX | | | OUTPUT MATRIX | | |
|---|---|---|---|---|---|
| 352a | 1 | 0 | 354a | $\frac{N}{8}$ | 0 |
| | $\frac{N}{8}+1$ | $\frac{N}{8}$ | | $\frac{N}{8}+1$ | 1 |
| 352b | $\frac{2N}{8}+1$ | $\frac{2N}{8}$ | 354b | $\frac{3N}{8}$ | $\frac{2N}{8}$ |
| | $\frac{3N}{8}+1$ | $\frac{3N}{8}$ | | $\frac{3N}{8}+1$ | $\frac{2N}{8}+1$ |

TABLE 3-continued

| | READ MATRIX | | | OUTPUT MATRIX | |
|---|---|---|---|---|---|
| 352c | $\frac{4N}{8}+1$ | $\frac{4N}{8}$ | 354c | $\frac{5N}{8}$ | $\frac{4N}{8}$ |
| | $\frac{5N}{8}+1$ | $\frac{5N}{8}$ | | $\frac{5N}{8}+1$ | $\frac{4N}{8}+1$ |
| 352d | $\frac{6N}{8}+1$ | $\frac{6N}{8}$ | 354d | $\frac{7N}{8}$ | $\frac{6N}{8}$ |
| | $\frac{7N}{8}+1$ | $\frac{7N}{8}$ | | $\frac{7N}{8}+1$ | $\frac{6N}{8}+1$ |

The following table 4 shows addresses for read matrixes 352a to 352d and addresses for output matrixes 354a to 354d, during the fourth stage of radix-2 FFT computation with respect to N data points.

TABLE 4

| | READ MATRIX | | | OUTPUT MATRIX | |
|---|---|---|---|---|---|
| 352a | $\frac{N}{8}$ | 0 | 354a | 1 | 0 |
| | $\frac{N}{8}+1$ | 1 | | $\frac{N}{8}+1$ | $\frac{N}{8}$ |
| 352b | $\frac{3N}{8}$ | $\frac{2N}{8}$ | 354b | $\frac{2N}{8}+1$ | $\frac{2N}{8}$ |
| | $\frac{3N}{8}+1$ | $\frac{2N}{8}+1$ | | $\frac{3N}{8}+1$ | $\frac{4N}{8}$ |
| 352c | $\frac{5N}{8}$ | $\frac{4N}{8}$ | 354c | $\frac{4N}{8}+1$ | $\frac{5N}{8}$ |
| | $\frac{5N}{8}+1$ | $\frac{4N}{8}+1$ | | $\frac{5N}{8}+1$ | $\frac{4N}{8}+1$ |
| 352d | $\frac{7N}{8}$ | $\frac{6N}{8}$ | 354d | $\frac{6N}{8}+1$ | $\frac{6N}{8}$ |
| | $\frac{7N}{8}+1$ | $\frac{6N}{8}+1$ | | $\frac{7N}{8}+1$ | $\frac{7N}{8}$ |

As set forth above, radix-2 FFT computation with respect to N data points is carried out with reference to FIGS. 17A and 17B and tables 2, 3 and 4.

FIG. 18 shows generalized data memory and memory interface of a data transform system according to the second embodiment of the present invention. Referring to FIG. 18, a data memory 400 includes M memory banks MB0 to MB(M–1), in which data is stored sequentially. For radix-R FFT computation, M arithmetic elements AE0 to AE(M–1) are simultaneously supplied with data stored at locations of the data memory 400 corresponding to addresses '0' to $$\left(\frac{(M-1)N}{M}+R-1\right).$$

A selector 351 in the memory interface 350 transfers data from the memory banks to a read matrix array 352. The read matrix array 352 is formed of $$\frac{M}{R}$$

read matrixes, each of which has an R*R size. Namely, the read matrix array 352 has an R*M size. An output matrix array 354 is formed of $$\frac{M}{R}$$

output matrixes, which correspond respectively to the read matrixes and each of which has an R*R size. Likewise, the output matrix array 354 has an R*M size. A transpose transform is carried out with respect to data of the read matrix array 352, and data thus transformed is stored in the output matrix array 354.

Figure 19:
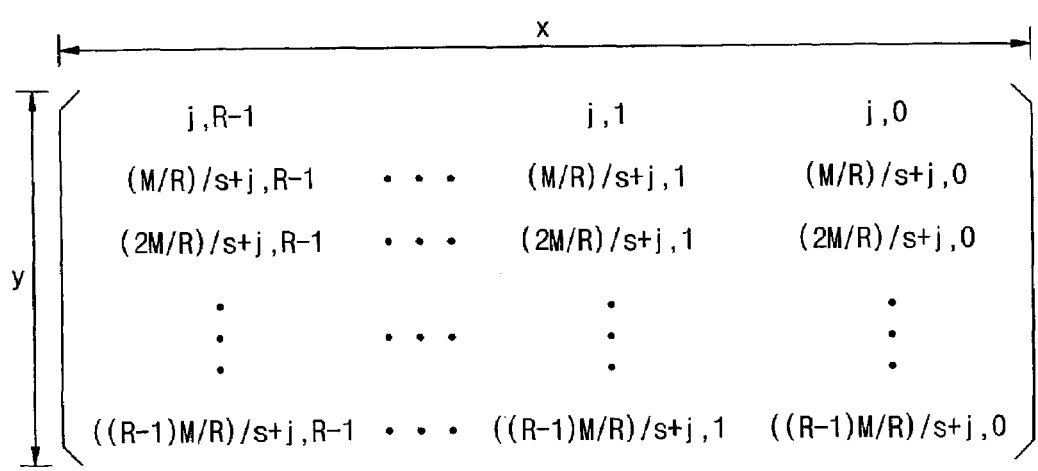
FIG. 19 is a diagram showing a generalized model of read matrixes illustrated in FIG. 18.

FIG. 19 shows a generalized model of read matrixes illustrated in FIG. 18. In FIG. 19, x=y=R, and a symbol 's' indicates a stage. The starting point of reading/writing data from/to a read matrix is represented by (j, 0).

As set forth above, a data transform system according to the present invention adopts a block-parallel computation format in which serial computation and parallel computation are combined, or mixed. With this approach, it is possible to change the type of FFT algorithm being performed, such as radix-2 and radix-4, and the number of arithmetic elements involved, based on the user's requirement, for example considering the trade-off between computation speed and the resulting size of the hardware.

While this invention has been particularly shown and described with references to preferred embodiments thereof, it will be understood by those skilled in the art that various changes in form and details may be made herein without departing from the spirit and scope of the invention as defined by the appended claims.

What is claimed is:

1. A data transform system for performing Fast Fourier Transform (FFT) and Inverse Fast Fourier Transform (IFFT) computations, comprising:
    M arithmetic elements that perform radix-R (where R is an integer) butterfly computation with respect to input data, respectively, to generate output data;
    a data memory that is divided into M banks and stores data computed by the arithmetic elements; and
    a memory interface that reads out M*R data points stored in the M banks of the data memory during R clock cycles, and stores the output data computed by the arithmetic elements in the M banks of the data memory in parallel, the memory interface performing a transpose transform operation on the read M*R data points, and providing the transpose transformed M*R data points to the arithmetic elements in parallel by R data points of the read M*R data points at a time, as the input data.

2. The data transform system according to claim 1, wherein the memory interface includes:
    data read means that provides the M*R data points to the arithmetic elements in parallel by R; and
    data write means that stores the data computed by the arithmetic elements to the banks corresponding to each arithmetic element in parallel.

3. The data transform system according to claim 2, wherein the M*R data points are stored sequentially in the M banks.

4. The data transform system according to claim 3, wherein M is equal to R.

5. The data transform system according to claim 4, wherein the data read means includes:
- a first buffer array that includes buffers arranged in a matrix of rows and columns and stores the M*R data points read out from the banks;
- a second buffer array that includes buffers arranged in a matrix of rows and columns; and
- a first converter that performs the transpose transform operation with respect to data points in the first buffer array and stores the data points thus transformed in the second buffer array.

6. The data transform system according to claim 5, wherein each of the first and second buffer arrays has a size of M*R.

7. The data transform system according to claim 5, wherein the rows of the second buffer array correspond to the arithmetic elements, respectively, and data points in the rows of the second buffer array are provided to corresponding arithmetic elements in parallel.

8. The data transform system according to claim 7, wherein when data points to be provided to the arithmetic elements are data points read out from the banks, the first converter stores data points of the columns of the first buffer array in the rows of the second buffer array.

9. The data transform system according to claim 7, wherein when data points to be provided to the arithmetic elements are data points read out from one of the banks, the first converter stores data points of the rows of the first buffer array in the rows of the second buffer array.

10. The data transform system according to claim 5, wherein the data write means includes:
- a third buffer array that includes buffers arranged in rows and columns and stores data computed by the arithmetic elements;
- a fourth buffer array that includes buffers arranged in rows and columns; and
- a second converter that performs a transpose transform operation with respect to data points in the third buffer array and stores the data points thus transformed in the fourth buffer array.

11. The data transform system according to claim 10, wherein the rows of the fourth buffer array correspond to the arithmetic elements, respectively, and data points of the rows of the fourth buffer array are provided to corresponding arithmetic elements in parallel.

12. The data transform system according to claim 11, wherein when data computed by the arithmetic elements are stored in the banks, the second converter stores data points of the columns of the third buffer array in the rows of the fourth buffer array.

13. The data transform system according to claim 11, wherein when data computed by the arithmetic elements are stored in one of the banks, the second converter stores data points of the rows of the third buffer array in the rows of the fourth buffer array.

14. The data transform system according to claim 4, wherein the data read means includes:
- a first buffer array that includes buffers arranged in rows and columns;
- a first selector that controls operation such that the M*R data points read out from the banks are stored at predetermined locations of the first buffer array, respectively;
- a second buffer array that includes buffers arranged in rows and columns; and
- a first converter that performs a transpose transform operation with respect to data points in the first buffer array and stores the data points thus transformed in the second buffer array.

15. The data transform system according to claim 14, wherein the rows of the second buffer array correspond to the arithmetic elements, respectively, and data points of the rows of the second buffer array are provided to corresponding arithmetic elements in parallel.

16. The data transform system according to claim 15, wherein the data write means includes:
- a third buffer array that includes buffers arranged in rows and columns and stores data computed by the arithmetic elements;
- a fourth buffer array that includes buffers arranged in rows and columns;
- a second converter that performs a transpose transform operation with respect to data points in the third buffer array and stores the data points thus transformed in the fourth buffer array; and
- a second selector that controls operation such that data points stored in the respective columns of the fourth buffer array are stored at the banks in parallel.

17. The data transform system according to claim 16, wherein the rows of the fourth buffer array correspond to the arithmetic elements, respectively, and data points of the columns of the fourth buffer array are provided to corresponding arithmetic elements in parallel.

18. The data transform system according to claim 3, wherein the data memory includes locations appointed by a K-bit address (where K is an integer), wherein locations of the respective banks are appointed by a bank address and a location address, the bank address formed of upper bits of the K-bit address and the location address formed of remaining bits.

19. The data transform system according to claim 18, wherein when data computed by the arithmetic elements is stored at locations (N is an integer less than K) of the respective banks, data in the data memory is read out according to address bits that are obtained by arranging bank address bits of the K-bit address and lower bits of the location address thereof in a reversed order.

20. A data transform system for performing Fast Fourier Transform (FFT) and Inverse Fast Fourier Transform (IFFT) computations, comprising:
- M arithmetic elements that perform radix-R (where R is an integer) butterfly computation with respect to input data, respectively, to generate output data;
- a data memory that is divided into M banks and stores data computed by the arithmetic elements; and
- a memory interface that reads out M*R data points stored in the banks and stores the output data computed by the arithmetic elements in the data memory, the memory interface providing the read M*R data points to the arithmetic elements by R, as the input data, wherein the memory interface includes:
  - data read means that provides the M*R data points to the arithmetic elements in parallel by R, wherein the M*R data points are stored sequentially in the M banks, wherein M is equal to R, and wherein the data read means includes:

a first buffer array that includes buffers arranged in a matrix of rows and columns and stores the M*R data points read out from the banks;

a second buffer array that includes buffers arranged in a matrix of rows and columns; and a first converter that performs a transpose transform operation with respect to data points in the first buffer array and stores the data points thus transformed in the second buffer array; and data write means that stores the data computed by the arithmetic elements to the banks corresponding to each arithmetic element in parallel.

21. The data transform system according to claim 20, Wherein each of the first and second buffer arrays has a size of M*R.

22. The data transform system according to claim 20, wherein the rows of the second buffer array correspond to the arithmetic elements, respectively, and data points in the rows of the second buffer array are provided to corresponding arithmetic elements in parallel.

23. The data transform system according to claim 22, wherein when data points to be provided to the arithmetic elements are data points read out from the banks, the first converter stores data points of the columns of the first buffer array in the rows of the second buffer array.

24. The data transform system according to claim 22, wherein when data points to be provided to the arithmetic elements are data points read out from one of the banks, the first converter stores data points of the rows of the first buffer array in the rows of the second buffer array.

25. The data transform system according to claim 20, wherein the data write means includes:

a third buffer array that includes buffers arranged in rows and columns and stores data computed by the arithmetic elements;

a fourth buffer array that includes buffers arranged in rows and columns; and a second converter that performs a transpose transform operation with respect to data points in the third buffer array and stores the data points thus transformed in the fourth buffer array.

26. The data transform system according to claim 25, wherein the rows of the fourth buffer array correspond to the arithmetic elements, respectively, and data points of the rows of the fourth buffer array are provided to corresponding arithmetic elements in parallel.

27. The data transform system according to claim 26, wherein when data computed by the arithmetic elements are stored in the banks, the second converter stores data points of the columns of the third buffer array in the rows of the fourth buffer array.

28. The data transform system according to claim 26, wherein when data computed by the arithmetic elements are stored in one of the banks, the second converter stores data points of the rows of the third buffer array in the rows of the fourth buffer array.

29. A data transform system for performing Fast Fourier Transform (FFT) and Inverse Fast Fourier Transform (IFFT) computations, comprising:

M arithmetic elements that perform radix-R (where R is an integer) butterfly computation with respect to input data, respectively, to generate output data;

a data memory that is divided into M banks and stores data computed by the arithmetic elements; and a memory interface that reads out M*R data points stored in the banks and stores the output data computed by the arithmetic elements in the data memory, the memory interface providing the read M*R data points to the arithmetic elements by R, as the input data, wherein the memory interface includes:

data read means that provides the M*R data points to the arithmetic elements in parallel by R, wherein the M*R data points are stored sequentially in the M banks, wherein M is equal to R, and wherein the data read means includes:

a first buffer array that includes buffers arranged in rows and columns;

a first selector that controls operation such that the M*R data points read out from the banks are stored at predetermined locations of the first buffer array, respectively;

a second buffer array that includes buffers arranged in rows and columns; and a first converter that performs a transpose transform operation with respect to data points in the first buffer array and stores the data points thus transformed in the second buffer array; and data write means that stores the data computed by the arithmetic elements to the banks corresponding to each arithmetic element in parallel.

30. The data transform system according to claim 29, wherein the rows of the second buffer array correspond to the arithmetic elements, respectively, and data points of the rows of the second buffer array are provided to corresponding arithmetic elements in parallel.

31. The data transform system according to claim 30, wherein the data write means includes:

a third buffer array that includes buffers arranged in rows and columns and stores data computed by the arithmetic elements;

a fourth buffer array that includes buffers arranged in rows and columns;

a second converter that performs a transpose transform operation with respect to data points in the third buffer array and stores the data points thus transformed in the fourth buffer array; and a second selector that controls operation such that data points stored in the respective columns of the fourth buffer array are stored at the banks in parallel.

32. The data transform system according to claim 31, wherein the rows of the fourth buffer array correspond to the arithmetic elements, respectively, and data points of the columns of the fourth buffer array are provided to corresponding arithmetic elements in parallel.

* * * * *